(12) United States Patent
Suka

(10) Patent No.: US 12,537,125 B2
(45) Date of Patent: Jan. 27, 2026

(54) SOLENOID, DAMPING FORCE ADJUSTMENT MECHANISM, AND DAMPING FORCE ADJUSTABLE SHOCK ABSORBER

(71) Applicant: Hitachi Astemo, Ltd., Hitachinaka (JP)

(72) Inventor: Ryuichi Suka, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 405 days.

(21) Appl. No.: 18/027,707

(22) PCT Filed: Sep. 14, 2021

(86) PCT No.: PCT/JP2021/033675
§ 371 (c)(1),
(2) Date: Mar. 22, 2023

(87) PCT Pub. No.: WO2022/070879
PCT Pub. Date: Apr. 7, 2022

(65) Prior Publication Data
US 2023/0386717 A1    Nov. 30, 2023

(30) Foreign Application Priority Data

Sep. 30, 2020    (JP) .................................. 2020-164782

(51) Int. Cl.
*H01F 7/08*    (2006.01)
*F16F 9/18*    (2006.01)
(Continued)

(52) U.S. Cl.
CPC .............. *H01F 7/081* (2013.01); *F16F 9/185* (2013.01); *F16F 9/461* (2013.01); *F16K 31/06* (2013.01);
(Continued)

(58) Field of Classification Search
CPC .... F16F 9/185; F16F 9/461; F16F 9/46; F16F 2230/18; F16F 2228/066; F16F 2222/12;
(Continued)

(56) References Cited

U.S. PATENT DOCUMENTS 4,539,542 A * 9/1985 Clark ................... H01F 7/1607
335/262
5,208,570 A * 5/1993 Nippert ............... H01F 41/0206
335/255
(Continued)

FOREIGN PATENT DOCUMENTS

JP         2013-11342      1/2013

OTHER PUBLICATIONS

International Search Report issued Oct. 26, 2021 in corresponding International Application No. PCT/JP2021/033675, with English language translation.
(Continued)

*Primary Examiner* — Robert A. Siconolfi
*Assistant Examiner* — James K Hsiao
(74) *Attorney, Agent, or Firm* — Wenderoth, Lind & Ponack, L.L.P.

(57) ABSTRACT

A solenoid comprises a mold coil, a housing, a yoke, an anchor, a cylinder, and an armature. The housing and the yoke are connected together with the cylinder intervening therebetween. The housing includes an accommodating tube portion including a first end portion, a second end portion, and a third end portion. The first end portion faces the anchor. The second end portion is axially recessed back from the first end portion and includes an abutting portion that abuts against the other axial end of the cylinder. The third end portion is axially recessed further back from the first end
(Continued)

portion than the second end portion and accommodates solder (copper ring) for sealing space between the third end portion and the cylinder.

5 Claims, 8 Drawing Sheets

(51) Int. Cl.
    *F16F 9/46*           (2006.01)
    *F16K 31/06*         (2006.01)
    *H01F 7/16*           (2006.01)
    *B60G 13/08*         (2006.01)
    *B60G 17/08*         (2006.01)

(52) U.S. Cl.
    CPC ........... *H01F 7/1607* (2013.01); *B60G 13/08* (2013.01); *B60G 17/08* (2013.01); *B60G 2202/24* (2013.01); *B60G 2206/41* (2013.01); *B60G 2500/11* (2013.01); *B60G 2600/184* (2013.01); *B60G 2800/162* (2013.01); *B60G 2800/916* (2013.01); *F16F 2222/12* (2013.01); *F16F 2228/066* (2013.01); *F16F 2230/18* (2013.01)

(58) Field of Classification Search
    CPC .... B60G 13/08; B60G 17/08; B60G 2202/24; B60G 2206/41; B60G 2500/11; B60G 2600/184; B60G 2800/916; H01F 7/081; H01F 7/1607; F16K 31/408
    See application file for complete search history.

(56) References Cited

U.S. PATENT DOCUMENTS

| | | | | |
|---|---|---|---|---|
| 5,234,265 | A * | 8/1993 | Tyler | B60T 8/00 303/119.2 |
| 5,318,354 | A * | 6/1994 | Tyler | B60T 8/367 303/3 |
| 6,170,767 | B1 * | 1/2001 | Herold | F02M 51/0685 239/585.1 |
| 7,874,541 | B2 * | 1/2011 | Abe | H01F 7/13 335/297 |
| 8,981,885 | B2 * | 3/2015 | Ocket | H01F 3/00 335/235 |
| 9,046,145 | B2 * | 6/2015 | Murakami | F16F 9/464 |
| 9,353,822 | B2 * | 5/2016 | Yamasaki | B23P 19/04 |
| 10,479,160 | B2 * | 11/2019 | Roessle | B60G 17/08 |
| 10,876,589 | B2 * | 12/2020 | Yamashita | F16F 9/369 |
| 11,320,017 | B2 * | 5/2022 | Bielak | F16F 9/585 |
| 2006/0193733 | A1 * | 8/2006 | Kume | B23K 35/30 417/222.2 |
| 2009/0205348 | A1 * | 8/2009 | Kume | F04B 27/1804 417/213 |
| 2012/0305349 | A1 * | 12/2012 | Murakami | F16F 9/325 188/266.6 |
| 2017/0276206 | A9 * | 9/2017 | Hall | H05K 7/02 |

OTHER PUBLICATIONS

Written Opinion of the International Searching Authority issued Oct. 26, 2021 in corresponding International Application No. PCT/JP2021/033675, with English language translation.

* cited by examiner

SOLENOID, DAMPING FORCE ADJUSTMENT MECHANISM, AND DAMPING FORCE ADJUSTABLE SHOCK ABSORBER

TECHNICAL FIELD

The disclosure relates, for example, to solenoids, damping force adjustment mechanisms, and damping force adjustable shock absorbers.

BACKGROUND ART

A vehicle, such as a four-wheel automobile, is provided with a shock absorber (damper) between a vehicle body (sprung) side and each wheel (unsprung) side. Known as such a vehicle shock absorber is, for example, a damping force adjustable hydraulic shock absorber that variably adjusts damping force according to driving conditions, vehicle behavior and the like. The damping force adjustable hydraulic shock absorber configures, for example, a semi-active suspension for a vehicle.

The damping force adjustable hydraulic shock absorber is capable of adjusting a generated damping force in a variable manner by adjusting the valve-opening pressure of a damping force adjustment valve using a variable damping force actuator. Patent Literature 1, for example, discusses a shock absorber using a solenoid as a variable damping force actuator. In the solenoid (solenoid block 31) of Patent Literature 1, a housing (core 74) and a yoke (solenoid case 71) are connected through a joining member (with no reference sign provided). In this case, the joining member (with no reference sign provided) is provided on the inner side (inner surface) with a projection (with no reference sign provided) protruding toward the inner diameter side. The opening-side edge of the housing (core 74) abuts against the projection (with no reference sign provided).

CITATION LIST

Patent Literature

PTL 1: Japanese Unexamined Patent Application Publication (Kokai) No. 2013-11342

SUMMARY OF INVENTION

Technical Problem

In the case of the solenoid (solenoid block 31) discussed in Patent Literature 1, the projection (with no reference sign provided) located on the inner side of the joining member (no reference sign provided) seems to be used for the alignment (axial positioning) of the housing (core 74). On the other hand, material and processing costs for the joining member might increase in order to provide the projection (with no reference sign provided) functioning as a shoulder on the inner side of the joining member (with no reference sign provided). Due to the presence of the projection (with no reference sign provided) on the inner side of the joining member (with no reference sign provided), there also is a possibility of decreasing a degree of freedom in designing the distance between the housing (core 74) and the corner portion (with no reference sign provided) of a stator (core 73).

An object of one embodiment of the invention is to provide a solenoid, a damping force adjustment mechanism, and a damping force adjustable shock absorber which allow "a reduction in cost for a joining member" and "an improvement in degree of freedom in designing a housing (accommodating member) and a stator."

Solution to Problem

One embodiment of the invention provides a solenoid comprising a coil wound into an annular shape and configured to generate magnetic force by being energized, a mover (movable element) provided to be movable in a winding axis direction of the coil and comprising a magnetic element, a stator provided at one side in a moving direction of the mover, a joining member fixed to the stator at one axial side and comprising a non-magnetic element, and an accommodating member configured to accommodate the mover, open at one axial end side, and including, in an order from an inner periphery at an open end, a first end portion facing the stator, a second end portion that is axially recessed back from the first end portion and includes an abutting portion that abuts against the other end of the joining member, and a third end portion that is axially recessed further back from the first end portion than the second end portion, the third end portion being configured to accommodate solder for sealing space between the third end portion and the joining member.

One embodiment of the invention provides a damping force adjustment mechanism comprising a coil wound into an annular shape and configured to generate magnetic force by being energized, a mover provided to be movable in a winding axis direction of the coil and comprising a magnetic element, a control valve configured to be controlled by motion of the mover, a stator provided at one side in a moving direction of the mover, a joining member fixed to the stator at one axial side and comprising a non-magnetic element, and an accommodating member configured to accommodate the mover, open at one axial end side, and including, in an order from an inner periphery at an open end, a first end portion facing the stator, a second end portion that is axially recessed back from the first end portion and includes an abutting portion that abuts against the other end of the joining member, and a third end portion that is axially recessed further back from the first end portion than the second end portion and configured to accommodate solder for sealing space between the third end portion and the joining member.

One embodiment of the invention provides a damping force adjustable shock absorber comprising a cylinder in which hydraulic fluid is sealingly contained, a piston provided inside the cylinder in a slidable manner, a piston rod coupled to the piston and extending outside the cylinder, and a damping force adjustment mechanism configured to generate damping force by controlling a flow of the hydraulic fluid generated by sliding motion of the piston within the cylinder. The damping force adjustment mechanism comprises a coil wound into an annular shape and configured to generate magnetic force by being energized, a mover provided to be movable in a winding axis direction of the coil and comprising a magnetic element, a control valve configured to be controlled by motion of the mover, a stator provided at one side in a moving direction of the mover, a joining member fixed to the stator at one axial side and comprising a non-magnetic element, and an accommodating member configured to accommodate the mover, open at one axial end side, and including, in an order from an inner periphery at an open end, a first end portion facing the stator, a second end portion that is axially recessed back from the first end portion and includes an abutting portion that abuts against the other end of the joining member, and a third end portion that is axially recessed further back from the first end portion than the second end portion and configured to accommodate solder for sealing space between the third end portion and the joining member.

One embodiment of the invention makes it possible to achieve "a reduction in cost for a joining member" and "an improvement in degree of freedom in designing an accommodating member and a stator."

DESCRIPTION OF EMBODIMENTS

A solenoid, a damping adjustment mechanism, and a damping force adjustable shock absorber according to an embodiment are discussed with reference to the attached drawings and with an example where the solenoid, the damping adjustment mechanism, and the damping force adjustable shock absorber are used in a damping force adjustable hydraulic shock absorber. The attached drawings (FIGS. 1 to 8) are prepared with the same accuracy as design drawings.

Figure 1:
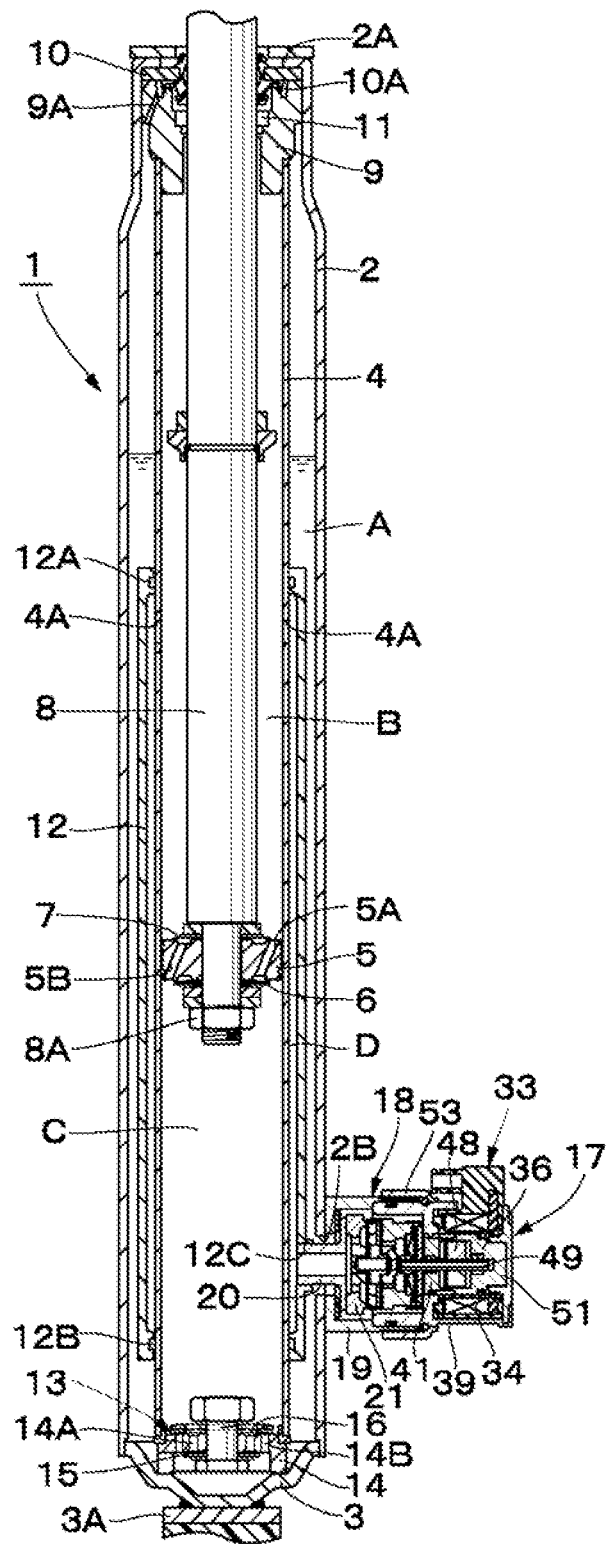
FIG. 1 is a longitudinal sectional view of a damping force adjustable shock absorber installed with a solenoid and a damping force adjustment mechanism according to an embodiment.

FIGS. 1 to 5 show the embodiment. In FIG. 1, a damping force adjustable hydraulic shock absorber 1 (hereinafter, referred to as a hydraulic shock absorber 1) comprises a damping force adjustment mechanism 17 using a solenoid 33 as a drive source. More specifically, the hydraulic shock absorber 1 as a damping force adjustable shock absorber comprises an outer tube 2, an inner tube 4 as a cylinder, a piston 5, a piston rod 8, a rod guide 9, and a damping force adjustment mechanism 17.

The hydraulic shock absorber 1 comprises the outer tube 2 in the shape of a bottomed tube which forms an outer shell. A lower end side of the outer tube 2 is closed by a bottom cap 3 using welding means or another like means. An upper end side of the outer tube 2 is a swaged portion (staked portion or crimped portion) 2A that is bent radially inwards. Provided between the swaged portion (staked portion or crimped portion) 2A and the inner tube 4 are a rod guide 9 and a seal member 10. On a lower portion side of the outer tube 2, an opening 2B is formed to be concentric with a connecting port 12C of a middle tube 12. The damping force adjustment mechanism 17 is attached to the lower portion side of the outer tube 2 so as to face the opening 2B. The bottom cap 3 is provided with an attachment eye 3A that is attached, for example, to a vehicle wheel side.

The inner tube 4 is provided inside the outer tube 2 coaxially with the outer tube 2. A lower end side of the inner tube 4 is fitted on the bottom valve 13. An upper end side of the inner tube 4 is fitted on the rod guide 9. Oil liquid as hydraulic liquid (hydraulic fluid) is sealingly contained in the inner tube 4 as a cylinder. The hydraulic liquid is not limited to oil liquid or oil but may be, for example, water in which additive is mixed or another like liquid.

An annular reservoir chamber A is formed between the inner tube 4 and the outer tube 2. Gas is sealingly contained in the reservoir chamber A with the oil liquid. The gas may be atmospheric-pressure air or a gaseous body such as a compressed nitrogen gas. The reservoir chamber A compensates the entry and exit of the piston rod 8. A fluid hole 4A is radially drilled in the inner tube 4 at an intermediate position in a length direction (axial direction) of the inner tube 4. The fluid hole 4A brings a rod-side fluid chamber B into constant communication with an annular fluid chamber D.

The piston 5 is slidably fitted inside the inner tube 4. In other words, the piston 5 is slidably provided inside the inner tube 4. The piston 5 defines (demarcates) an interior portion of the inner tube 4 into two chambers including the rod-side fluid chamber B and a bottom-side fluid chamber C. A plurality of fluid passages 5A and a plurality of fluid passages 5B are formed in the piston 5 at intervals in a circumferential direction. The fluid passages 5A, 5B allow the rod-side fluid chamber B and the bottom-side fluid chamber C to communicate with each other.

An extension-side disc valve 6 is provided at a lower end surface of the piston 5. When pressure in the rod-side fluid chamber B exceeds a relief set pressure while the piston 5 is making an upward sliding displacement during an extension stroke of the piston rod 8, the extension-side disc valve 6 is opened to release the pressure to the bottom-side fluid chamber C side through each of the fluid passages 5A. The relief set pressure is set higher than valve-opening pressure in a situation where the damping force adjustment mechanism 17 is set to be hard.

A compression-side check valve 7 is provided in an upper end surface of the piston 5. The check valve 7 is opened when the piston 5 makes a downward sliding displacement during a compression stroke of the piston rod 8, and closed otherwise. The check valve 7 allows the oil liquid in the bottom-side fluid chamber C to flow through each of the fluid passages 5B toward the rod-side fluid chamber B and prevents the oil liquid from flowing in the opposite direction. Valve-opening pressure of the check valve 7 is set lower than valve-opening pressure in a situation where the damping force adjustment mechanism 17 is set to be soft, thereby substantially not generating damping three. When it is said here that the valve-opening pressure substantially does not generate damping force, it means that the valve-opening pressure of the check valve 7 is equal to or smaller than friction of the piston 5 or the seal member 10 and therefore does not affect vehicle motion.

The piston rod 8 extends in an axial direction (vertical direction in FIG. 1) within the inner tube 4. A lower end side of the piston rod 8 is inserted in the inner tube 4. The piston rod 8 is secured to the piston 5 with a nut 8A or the like. An upper end side of the piston rod 8 protrudes outside the outer tube 2 and the inner tube 4 through the rod guide 9. In other words, the piston rod 8 is coupled to the piston 5 to extend outside the inner tube 4. The piston rod 8 may be configured as a so-called double rod by the lower end being further elongated and outwardly projected from a bottom portion (bottom cap 3, for example) side.

The rod guide 9 having a stepped cylinder-like shape is provided in the upper end side of the inner tube 4. The rod guide 9 positions an upper side portion of the inner tube 4 at the center of the outer tube 2 and guides the piston rod 8 at an inner peripheral side in an axially slidable manner. The seal member 10 having an annular shape is provided between the rod guide 9 and the swaged portion (staked portion or crimped portion) 2A of the outer tube 2. The seal member 10 is configured, for example, by baking elastic material, such as rubber, onto an annular metal disc provided with a hole at the center, through which the piston rod 8 extends. An inner periphery of the elastic material of the seal member 10 comes into sliding contact with an outer peripheral side of the piston rod 8, whereby the seal member 10 seals space between itself and the piston rod 8.

On a lower surface side of the seal member 10, a lip seal 10A is formed as a check valve extending to contact the rod guide 9. The lip seal 10A is arranged between a fluid holding chamber 11 and the reservoir chamber A. The lip seal 10A allows oil liquid or another like fluid in the fluid holding chamber 11 to flow through a return passage 9A of the rod guide 9 toward the reservoir chamber A side and prevents a reverse flow.

Arranged between the outer tube 2 and the inner tube 4 is a middle tube 12 comprising a tube element. The middle tube 12 is attached, for example, to an outer peripheral side of the inner tube 4 through upper and lower tubular seals 12A, 12B. The middle tube 12 forms an annular fluid chamber D inside. The annular fluid chamber D extends around the outer peripheral side of the inner tube 4 over the whole circumference of the inner tube 4. The annular fluid chamber D is a fluid chamber that is independent of the reservoir chamber A. The annular fluid chamber D is in constant communication with the rod-side fluid chamber B through the radial fluid hole 4A formed in the inner tube 4. The annular fluid chamber D functions as a passage in which a hydraulic liquid flow is generated by displacement of the piston rod 8. The connecting port 12C is provided at a lower end side of the middle tube 12. A connecting pipe element 20 of the damping force adjustment valve 18 is attached to the connecting port 12C.

The bottom valve 13 is provided between the bottom cap 3 and the inner tube 4 to be located at the lower end side of the inner tube 4. The bottom valve 13 is configured by a valve body 14 that defines (demarcates) the reservoir chamber A and the bottom-side fluid chamber C between the bottom cap 3 and the inner tube 4, a compression-side disc valve 15 provided on a lower surface side of the valve body 14, and an extension-side check valve 16 provided on an upper surface side of the valve body 14. Fluid passages 14A, 14B are formed in the valve body 14 at intervals in a circumferential direction. The fluid passages 14A, 14B allow the reservoir chamber A and the bottom-side fluid chamber C to communicate with each other.

When pressure in the bottom-side fluid chamber C exceeds a relief set pressure while the piston 5 is making a downward sliding displacement during the compression stroke of the piston rod 8, the compression-side disc valve 15 is opened to release the pressure to the reservoir chamber A side through each of the fluid passages 14A. The relief set pressure is set higher than valve-opening pressure in a situation where the damping force adjustment mechanism 17 is set to be hard.

The extension-side check valve 16 is opened when the piston 5 makes the upward sliding displacement during the extension stroke of the piston rod 8, and closed otherwise. The check valve 16 allows the oil liquid in the reservoir chamber A to flow through each of the fluid passages 14B toward the bottom-side fluid chamber C and prevents the oil liquid from flowing in the opposite direction. Valve-opening pressure of the check valve 16 is set lower than valve-opening pressure in a situation where the damping force adjustment mechanism 17 is set to be soft, and thereby substantially does not generate a damping force.

The damping force adjustment mechanism 17 for variably adjusting a generated damping force of the hydraulic shock absorber 1 is now discussed with reference to FIG. 2 as well as FIG. 1.

The damping force adjustment mechanism 17 is a mechanism configured to control the hydraulic liquid flow generated by sliding motion of the piston 5 within the cylinder (inner tube 4) to generate the damping force and variably adjust the generated damping force of the hydraulic shock absorber 1. The damping force adjustment mechanism 17 in FIG. 2 is in a state after a coil 34A of the solenoid 33 is externally energized (for example, controlled to generate a hard damping force), so that an armature 48 (actuating pin 49) moves to the left side in FIG. 2 (that is, in a valve-closing direction where a pilot valve element 32 is seated on a valve seat portion 26E of a pilot body 26).

As illustrated in FIG. 1, the damping force adjustment mechanism 17 is so provided that a proximal end side (left-side end in FIG. 1) thereof is interposed between the reservoir chamber A and the annular fluid chamber D, and that a distal end side (right-side end in FIG. 1) thereof protrudes from the lower portion side of the outer tube 2 in a radially outward direction. The damping force adjustment mechanism 17 controls the flow of the oil liquid from the annular fluid chamber D to the reservoir chamber A by means of the damping force adjustment valve 18, to thereby generate the damping force. The damping force adjustment mechanism 17 variably adjusts the generated damping force by adjusting valve-opening pressure of the damping force adjustment valve 18 with the solenoid 33 used as a variable damping force actuator. The damping force adjustment mechanism 17 thus controls the hydraulic fluid (oil liquid) flow generated by the sliding motion of the piston 5 within the inner tube 4.

The damping force adjustment mechanism 17 is configured by including the damping force adjustment valve 18 that variably controls the flow of the oil liquid from the annular fluid chamber D to the reservoir chamber A to generate the damping force having hard or soft characteristics, and the solenoid 33 that adjusts a valve-opening/closing operation of the damping force adjustment valve 18. In other words, the valve-opening pressure of the damping force adjustment valve 18 is adjusted by the solenoid 33 used as a variable damping force actuator. The generated damping force is thus controlled to be varied to have hard or soft characteristics. The damping force adjustment valve 18 is a valve that is adjusted in valve-opening/closing operation by the solenoid 33. The damping force adjustment valve 18 is provided in a passage where the hydraulic liquid flow is generated by the displacement of the piston rod 8 (for example, between the annular fluid chamber D and the reservoir chamber A).

The damping force adjustment valve 18 is configured by including a substantially cylindrical valve case 19 including a proximal end side secured around the opening 2B of the outer tube 2 and a distal end side protruding from the outer tube 2 in the radially outward direction; the connecting pipe element 20 including a proximal end side fixed to the connecting port 12C of the middle tube 12 and a distal end side formed into an annular flange portion 20A and arranged inside the valve case 19 with space between the connecting pipe element 20 and the valve case 19; and a valve member 21 abutting against the flange portion 20A of the connecting pipe element 20.

Figure 2:
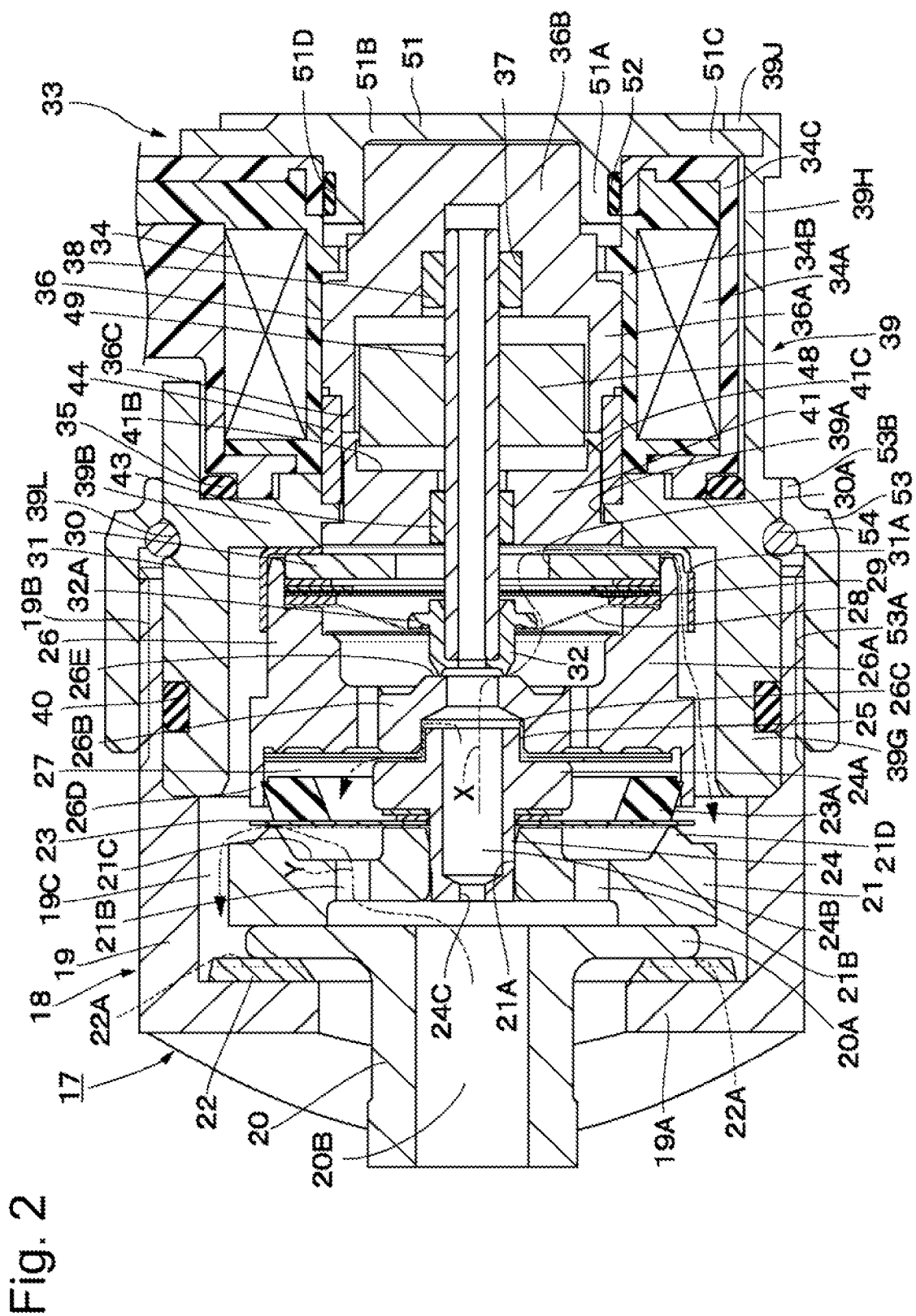
FIG. 2 is an enlarged sectional view focusing on a damping force adjustment valve and the solenoid in FIG. 1.

As illustrated in FIG. 2, the proximal end side of the valve case 19 is formed into an annular inner flange portion 19A extending radially inwards. The distal end side of the valve case 19 is formed into an external thread portion 19B onto which a lock nut 53 is screwed. The lock nut 53 couples the valve case 19 with a yoke 39 (one side tube portion 39G) of the solenoid 33. Space between an inner peripheral surface of the valve case 19 and an outer peripheral surface of the valve member 21 and space between the inner peripheral surface of the valve case 19 and an outer peripheral surface of the pilot body 26 and the like make up an annular fluid chamber 19C that is in constant communication with the reservoir chamber A. The valve case 19 and the solenoid 33 may be coupled together with the lock nut 53 or may be so configured, for example, that the distal end side of the valve case is swaged (staked or crimped) onto the yoke of the solenoid (instead of using a lock nut).

Inside the connecting pipe element 20 is a fluid passage 20B, one side of which is in communication with the annular fluid chamber D, and the other side of which extends as far as the valve member 21. A circular ring-shaped spacer 22 is provided between the flange portion 20A of the connecting pipe element 20 and the inner flange portion 19A of the valve case 19 in a state being held therebetween. The spacer 22 is provided with a plurality of notches 22A extending in a radial manner. The notches 22A function as radial fluid passages for bringing the fluid chamber 19C and the reservoir chamber A into communication with each other. Although the present embodiment provides the notches 22A for forming fluid passages in the spacer 22, the notches for forming fluid passages may be radially provided in the inner flange portion 19A of the valve case 19, instead of the spacer 22. Such a configuration makes it possible to omit the spacer 22 and therefore reduce the number of components.

The valve member 21 is provided with a center hole 21A located at the radial center and extending in an axial direction. The valve member 21 is further provided with a plurality of fluid passages 21B around the center hole 21A. The plurality of fluid passages 21B are spaced apart in a circumferential direction. Each of the fluid passages 21B is in constant communication with the fluid passage 203 side of the connecting pipe element 20 at one side (left side in FIGS. 1 and 2). An annular concave portion 21C and an annular valve seat 21D are provided in an end surface of the other side (right side in FIGS. 1 and 2) of the valve member 21. The annular concave portion 21C is formed around the other-side opening of the fluid passage 21B. The annular valve seat 21D is located radially outside the annular concave portion 21C. A main valve 23 is seated on and unseated from the annular valve seat 21D. Each of the fluid passages 21 of the valve member 21 functions as a passage, through which pressure fluid of a flow rate according to opening degree of the main valve 23 flows, between the fluid passage 20B of the connecting pipe element 20 which is in communication with the annular fluid chamber D and the fluid chamber 19C of the valve case 19 which is in communication with the reservoir chamber A.

The main valve 23 is configured by a disc valve, an inner region of which is held between the valve member 21 and a large diameter portion 24A of a pilot pin 24. The main valve 23 is seated on and unseated from the annular valve seat 21D of the valve member 21 at an outer peripheral side. An elastic seal member 23A is secured to an outer peripheral portion on a rear surface side of the main valve 23 by baking or another like means. The main valve 23 is opened when unseated from the annular valve seat 21D by receiving pressure of the fluid passage 21B side (annular fluid chamber D side) of the valve member 21. The fluid passage 21B (annular fluid chamber D side) of the valve member 21 thus comes into communication with the fluid chamber 19C (reservoir chamber A side) through the main valve 23. Amount (flow rate) of pressure fluid flowing in a direction of arrow Y at the time of the communication is variably adjusted according to opening degree of the main valve 23.

The pilot pin 24 is formed into a stepped cylinder-like shape and provided with the annular large diameter portion 24A in an axially middle portion. The pilot pin 24 includes a center hole 24B at an inner peripheral side. The center hole 24B extends in the axial direction. A small diameter hole (orifice 24C) is formed in one end portion (end portion on the connecting pipe element 20 side) of the center hole 24B. One end side (left-side end in FIGS. 1 and 2) of the pilot pin 24 is press-fitted into the center hole 21A of the valve member 21, whereby the main valve 23 is held between the large diameter portion 24A and the valve member 21.

The other end side (right-side end in FIGS. 1 and 2) of the pilot pin 24 is fitted in a center hole 26C of the pilot body 26. In this state, a fluid passage 25 extending in the axial direction is formed between the center hole 26C of the pilot body 26 and the other end side of the pilot pin 24. The fluid passage 25 is in communication with a back pressure chamber 27 that is formed between the main valve 23 and the pilot body 26. In other words, a plurality of axially extending fluid passages 25 are circumferentially provided in a lateral surface on the other end side of the pilot pin 24. Other circumferential regions on the other end side of the pilot pin 24 are press-fitted in the center hole 26C of the pilot body 26.

The pilot body 26 is formed into a substantially bottomed cylinder-like element and includes a cylindrical portion 26A with a stepped hole formed inside and a bottom portion 26B closing the cylindrical portion 26A. The bottom portion 26B of the pilot body 26 is provided with the center hole 26C in which the other end side of the pilot pin 24 is fitted. On one end side (left-side end in FIGS. 1 and 2) of the bottom portion 26B of the pilot body 26, a protruding tube portion 26D is integrally provided at an outer diameter side over the whole circumference. The protruding tube portion 26D protrudes toward the valve member 21 side. The elastic seal member 23A of the main valve 23 is fitted in an inner peripheral surface of the protruding tube portion 26D in a liquid tight manner, to thereby form the back pressure chamber 27 between the main valve 23 and the pilot body 26. The back pressure chamber 27 generates pressure (inner pressure, pilot pressure) acting to push the main valve 23 in a valve-closing direction, that is, in such a direction that the main valve 23 is seated on the annular valve seat 21D of the valve member 21.

A valve seat portion 26E is provided on the other end side (right-side end in FIGS. 1 and 2) of the bottom portion 26B of the pilot body 26 to surround the center hole 26C. The pilot valve element 32 is seated on and unseated from the valve seat portion 26E. Arranged inside the cylindrical portion 26A of the pilot body 26 are a return spring 28 configured to bias the pilot valve element 32 in a direction away from the valve seat portion 26E of the pilot body 26, a disc valve 29 configuring a fail-safe valve in a situation where the solenoid 33 is not being energized (when the pilot valve element 32 is farthest from the valve seat portion 26E), a holding plate 30 in which a fluid passage 30A is formed at a center side, and other like elements.

A cap 31 is fixed to an open end of the cylindrical portion 26A of the pilot body 26 in a fitted manner with the return spring 28, the disc valve 29, the holding plate 30 and the like arranged inside the cylindrical portion 26A. Four notches 31A are formed in the cap 31, for example, at intervals in a circumferential direction. As shown by arrow X in FIG. 2, the notches 31A function as flow paths that allow the oil liquid sent to the solenoid 33 side through the fluid passage 30A of the holding plate 30 to flow into the fluid chamber 19C (reservoir chamber A side).

The pilot valve element 32 configures a pilot valve (control valve) in consort with the pilot body 26. The pilot valve element 32 is formed into a stepped cylinder-like shape. A distal end portion of the pilot valve element 32, that is, the distal end portion seated on and unseated from the valve seat portion 26E of the pilot body 26 has a tapered shape which becomes narrower towards the distal end. The actuating pin 49 of the solenoid 33 is fixed inside the pilot valve element 32 in a fitted manner. Valve-opening pressure of the pilot valve element 32 is adjusted according to current applied to the solenoid 33. The pilot valve (pilot body 26 and pilot valve element 32) as a control valve is thus controlled by displacement of the actuating pin 49 (namely, armature 48) of the solenoid 33. A flange portion 32A is formed at a proximal end side of the pilot valve element 32 over the whole circumference. The flange portion 32A functions as a spring bearing. The flange portion 32A configures a fail-safe valve by coming into abutment against an inner peripheral portion of the disc valve 29 while the solenoid 33 is not being energized, that is, when the pilot valve element 32 is displaced to a fully open position at which the pilot valve element 32 is farthest from the valve seat portion 26E.

Figure 3:
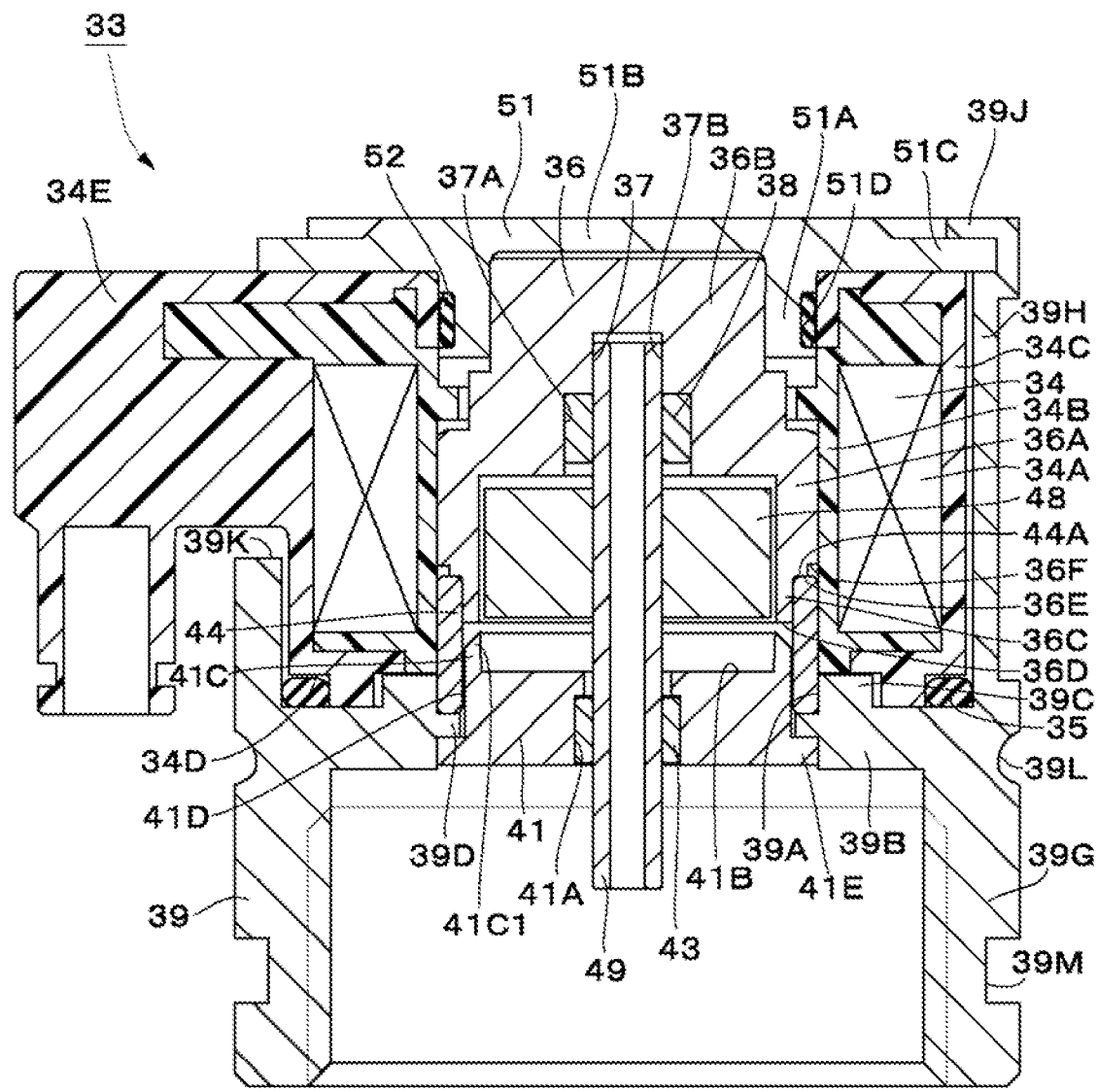
FIG. 3 is an enlarged sectional view focusing on the solenoid in FIG. 1.
Figure 4:
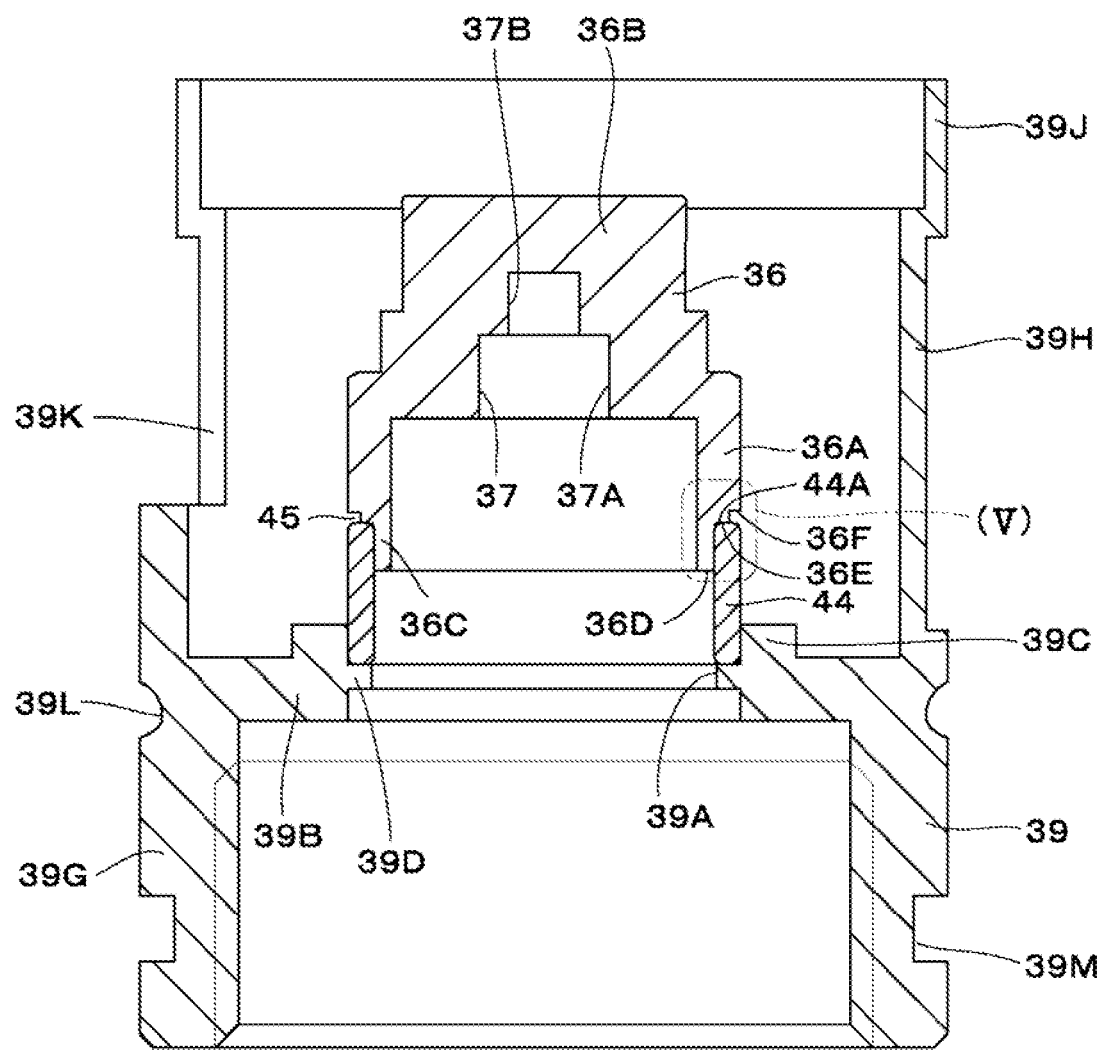
FIG. 4 is a sectional view showing an accommodating member (housing), a joining member (cylinder), and a stator (yoke) in an assembled state.
Figure 5:
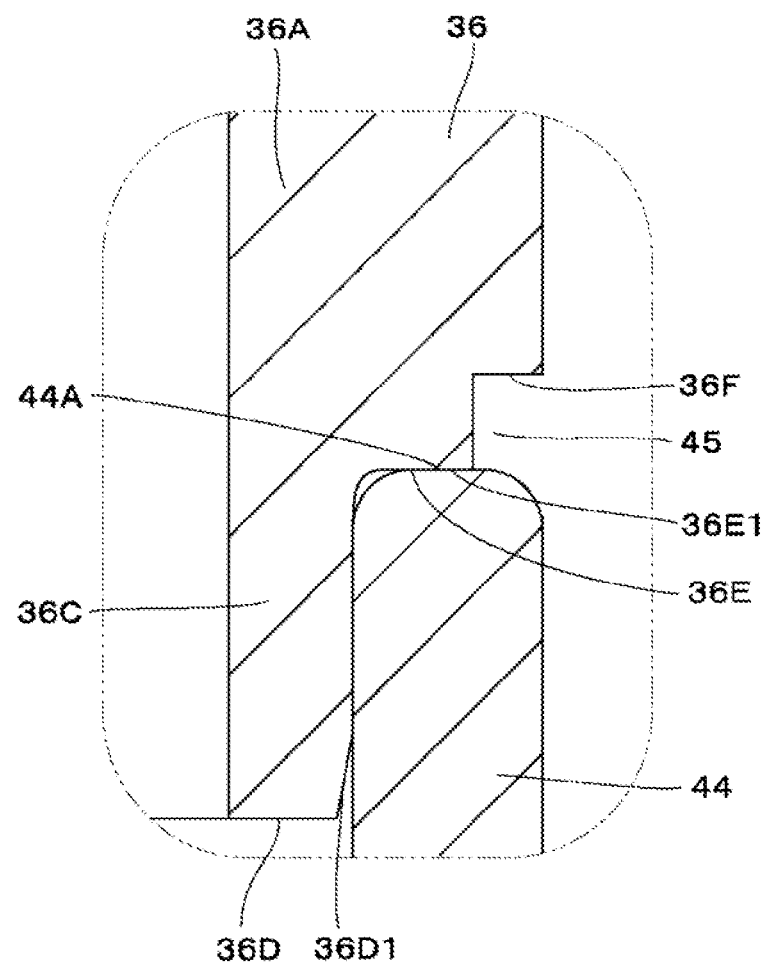
FIG. 5 is an enlarged sectional view of a (V) area in FIG. 4.
Figure 6:
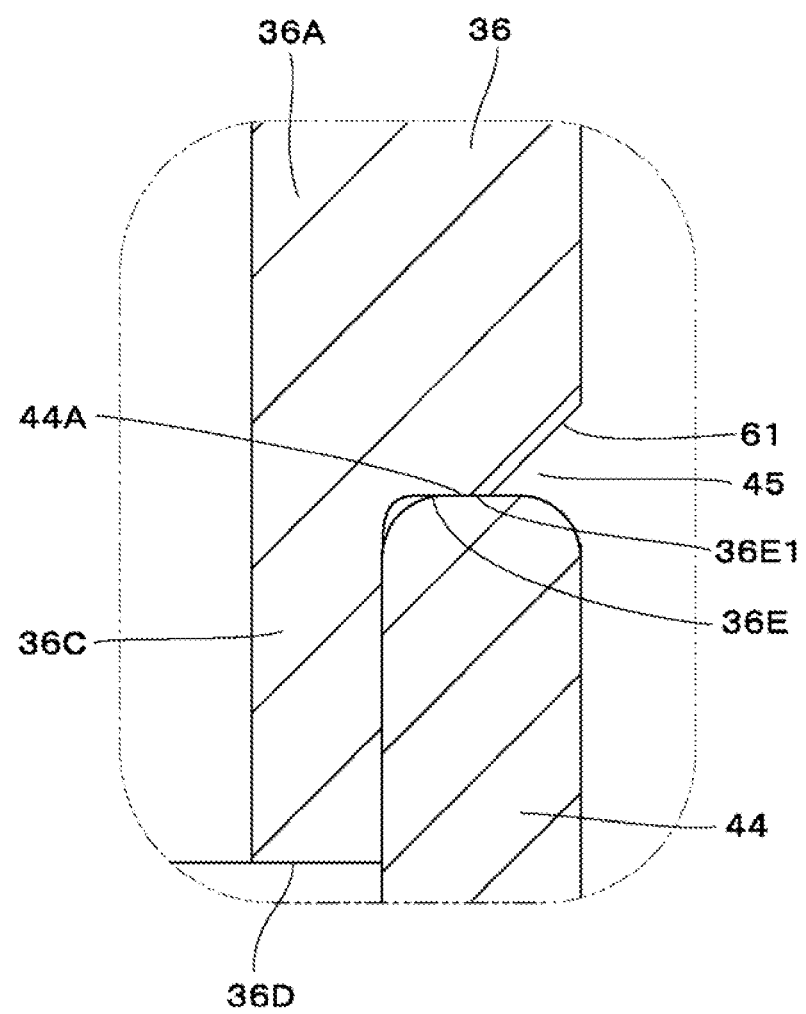
FIG. 6 is a sectional view of the corresponding area in FIG. 5 which shows the accommodating member, the joining member and the like according to a first modification example.
Figure 7:
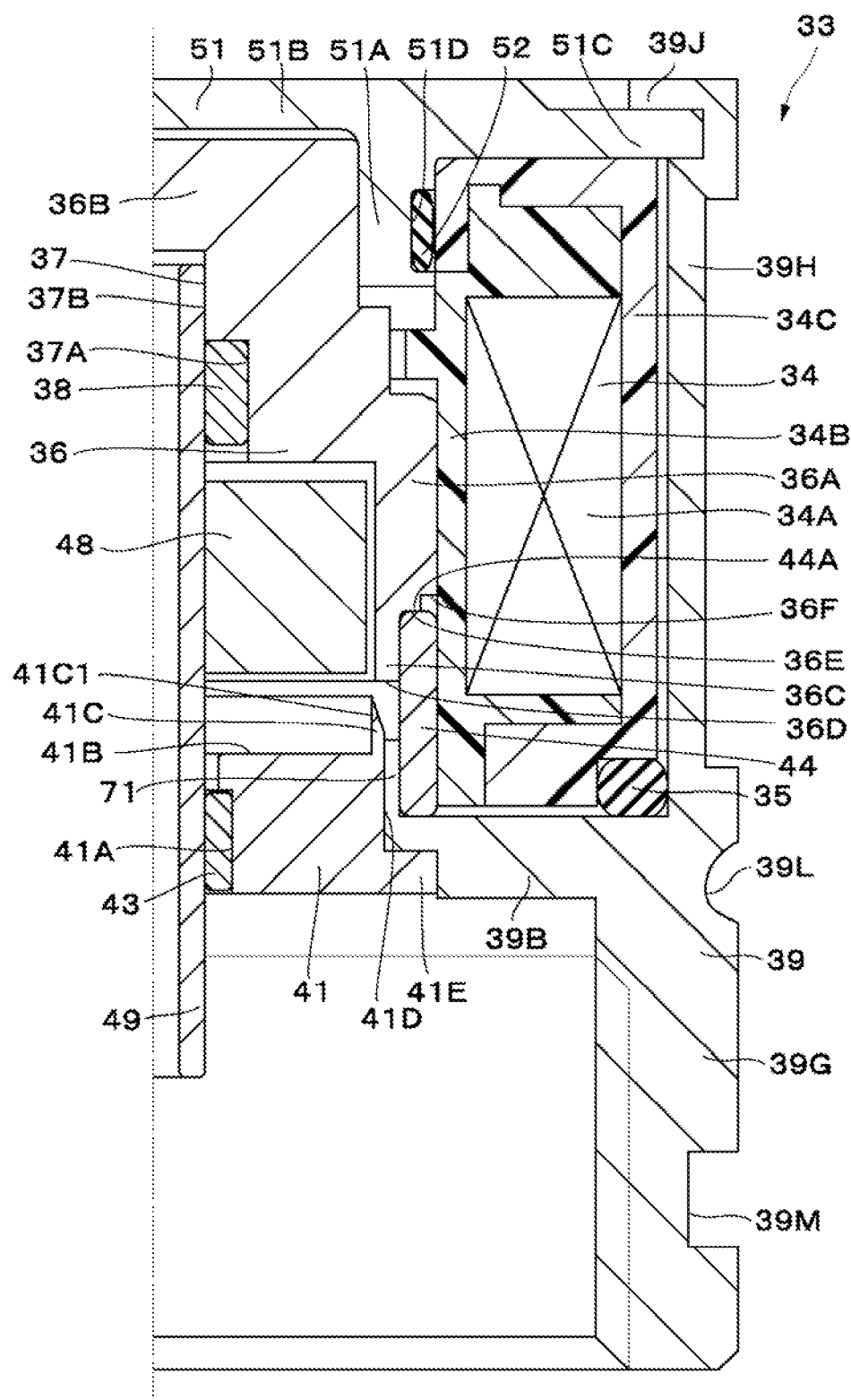
FIG. 7 is a sectional view of a half portion of a solenoid according to a second modification example.
Figure 8:
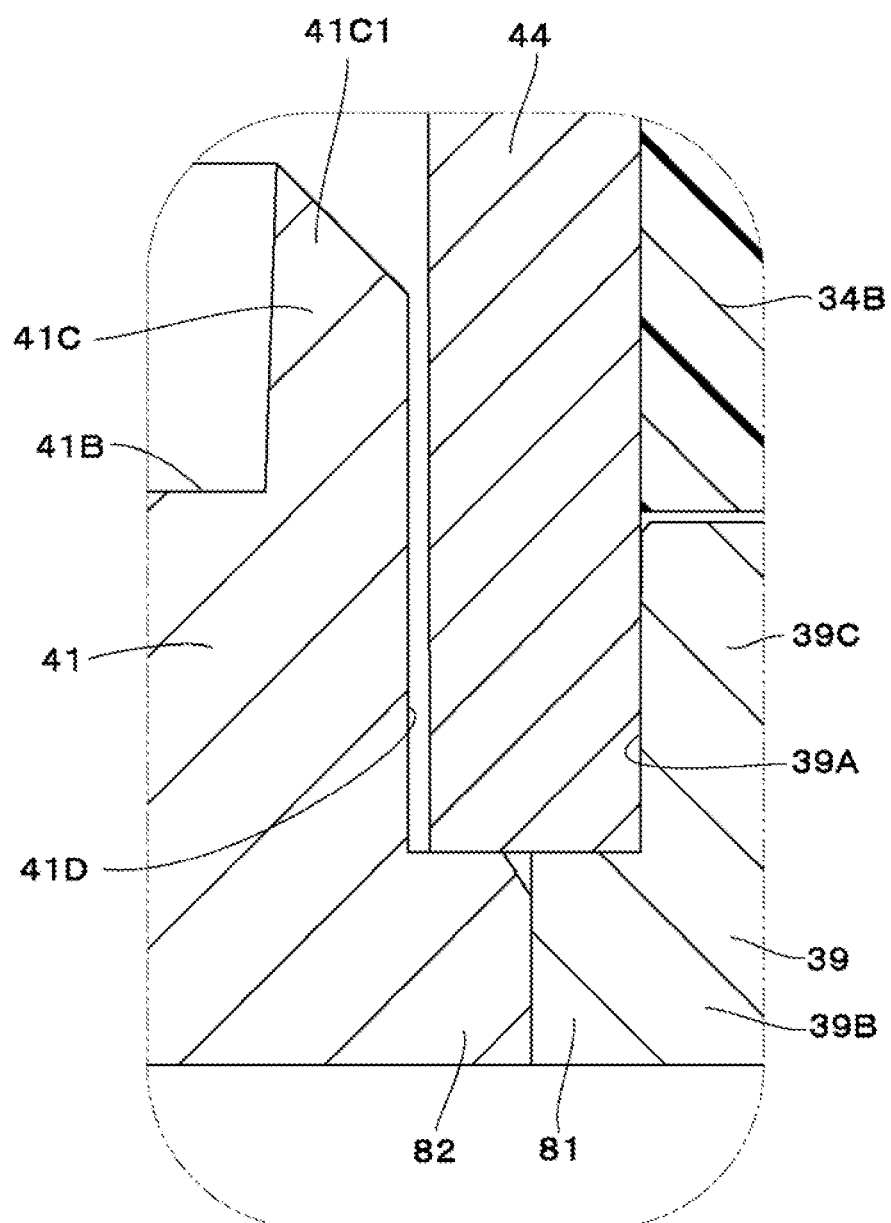
FIG. 8 is an enlarged sectional view of a joining portion of a stator (yoke, anchor) and a joining member according to a third modification example.

The following discussion explains the solenoid 33 configuring the damping force adjustment mechanism 17 in consort with the damping force adjustment valve 18 with reference with FIGS. 3 to 5 as well as FIGS. 1 and 2. FIG. 3 shows the solenoid 33 with the right side in FIG. 2 turned to the upper side and provided with reference signs. Accordingly, the horizontal direction in FIGS. 1 and 2 corresponds to the vertical direction in FIGS. 3 to 5.

The solenoid 33 is installed in the damping force adjustment mechanism 17 as a variable dumping force actuator of the damping force adjustment mechanism 17. In other words, the solenoid 33 is used in a damping force adjustable shock absorber to adjust the valve-opening/closing operation of the damping force adjustment valve 18. The solenoid 33 includes a mold coil 34, a housing 36 as an accommodating member, the yoke 39 as a stator, an anchor 41 as a stator, a cylinder 44 as a joining member (non-magnetic ring), the armature 48 as a mover (movable iron core), the actuating pin 49, and a cover member 51.

As for the solenoid (solenoid block 31) disclosed in Patent Literature 1 mentioned above, the housing (core 74) and the yoke (solenoid case 71) are connected together through the joining member (with no reference sign provided). In this case, the housing (core 74) includes a small diameter portion (with no reference sign provided) in which the joining member (with no reference sign provided) is fitted, and a large diameter portion (with no reference sign provided) having a larger outer diameter dimension than the small diameter portion. Provided between the small diameter portion and the large diameter portion is a notch (with no reference sign provided) for accommodating solder. A projection (with no reference sign provided) is provided inside (at an inner surface) of the joining member (with no reference sign provided) so as to protrude inwards. An open-side edge of the housing (core 74) abuts against the projection, to thereby achieve the alignment (axial positioning) of the housing (core 74).

Preferably, the solenoid can have three functions including "accommodating solder between the housing and the joining member," "performing an accurate alignment of the housing." and "transmitting a magnetic flux with the mover," and the cost for the joining member (with no reference sign provided) can be reduced at the same time. It is also preferable that the solenoid be reduced in axial length, and yet that the solenoid (mover) be improved in thrust characteristics.

As for the solenoid (solenoid block 31) disclosed in Patent Literature 1, material and processing costs for the joining member might increase in order to provide the projection (with no reference sign provided) functioning as a shoulder on the inner side of the joining member (with no reference sign provided). Due to the presence of the projection (with no reference sign provided) on the inner side of the joining member (with no reference sign provided), there also is a possibility of decreasing the degree of freedom in designing a distance between the housing (core 74) and the corner portion (with no reference sign provided) of a stator (core 73). This might lead to an increase in axial length of the solenoid and a deterioration in thrust characteristics.

To solve this, the present embodiment provides an accommodating tube portion 36A (small diameter tube portion 36C) of the housing 36 with three end portions 36D, 36E, and 36F which are convex portions, as illustrated in FIGS. 4 and 5 in an enlarged manner. The end portion 36F (third end portion 36F) located on an upper side in a vertical direction in FIGS. 4 and 5 configures a solder accommodating portion for placing solder (copper ring) at the time of assembly of the housing 36 and the cylinder 44. The end portion 36E (second end portion 36E) located in the middle in the vertical direction in FIGS. 4 and 5 configures a position fixing portion for maintaining positional relation between the housing 36 and the anchor 41 by contacting (abutting against) the cylinder 44 at the time of assembly of the housing 36 and the cylinder 44. The end portion (first end portion 36D) located on a lower side in the vertical direction in FIGS. 4 and 5 configures a magnetic flux transmitting portion for carrying out the transmission of a magnetic flux with the armature 48 at a position where the housing 36 is held by the middle end portion 36E (second end portion 36E) functioning as the position fixing portion.

In comparison between conventional art and the embodiment, conventional art provides a position maintaining function (aligning function) to a maintaining member (cylinder), whereas the embodiment provides the position maintaining function (aligning function) to the housing 36 instead of the maintaining member (cylinder). In the embodiment, accordingly, there is no need to provide a projection functioning as a shoulder on the inner diameter side of the cylinder 44, so that for example the cylinder 44 can be formed into a mere cylindrical element. This makes it possible to reduce material and processing costs for the cylinder 44 and improve the degree of freedom in designing a distance between the housing 36 and a protruding portion 41C that is the corner portion of the anchor 41. In further comparison with conventional art, the embodiment only modifies the shape of the housing 36 and of the cylinder 44 and thus makes it unlikely that the axial length and thrust characteristics of the solenoid 33 will be affected. The embodiment therefore can reduce the axial length of the solenoid 33 and yet can improve the thrust characteristics of the solenoid 33 (armature 48). The following discussion explains the solenoid 33 of the embodiment which comprises the aforementioned housing 36 and cylinder 44 with reference to FIGS. 2 to 5.

As discussed above, the solenoid 33 includes the mold coil 34, the housing 36, the yoke 39, the anchor 41, the cylinder 44, the armature 48, and the actuating pin 49. The mold coil 34 is formed into a substantially cylindrical shape by integrally covering (mold-forming) the coil 34A and a coil bobbin 34B with a resin member 34C, such as thermosetting resin, in a state where the coil 34A is wound around the coil bobbin 34B. Provided in a part of the mold coil 34 in a circumferential direction is a cable draw-out portion 34E protruding axially or radially outwards. The cable draw-out portion 34E is connected with an electric wire cable, not shown. The coil 34A of the mold coil 34 is wound around the coil bobbin 34B in an annular form and functions as an electromagnet to generate magnetic force by external electric power supply (energization) through the cable.

A seal groove 34D is formed over the whole circumference in a lateral surface (one axial side end surface) of the resin member 34C of the mold coil 34, which faces the yoke 39 (annular portion 39B). Placed inside the seal groove 34D is a seal member (O-ring 35, for example). The O-ring 35 liquid-tightly seals space between the mold coil 34 and the yoke 39 (annular portion 39B). It is therefore possible to prevent dust containing rain water or mud water from entering the tubular projecting portion 39C side of the yoke 39 through the space between the yoke 39 and the mold coil 34.

The coil employed in the present embodiment is not limited to the mold coil 34 comprising the coil 34A, the coil bobbin 341, and the resin member 34C but may be another coil. For example, the coil may be so configured that the outer periphery thereof is covered with an overmold, not shown, which is produced by molding a resin material over (from an outer peripheral side of) the coil with the coil wound around a coil bobbin made of electric insulating material.

The housing 36 configures a first fixed iron core (accommodating member) that is provided at an inner peripheral side of the mold coil 34 (that is, at an inner periphery of the coil 34A). The housing 36 is formed as a tube element in the shape of a cylinder with a lid, which is made of magnetic material (magnetic element), such as low-carbon steel and mechanical structural carbon steel (S10C). The housing 36 is configured by including an accommodating tube portion 36A as an accommodating portion that extends in a winding axis direction of the mold coil 34 (coil 34A) and is open at one end side (the left-side end in FIG. 2, the lower side in FIG. 3 to 5), a stepped lid portion 36H closing the other end side (the right side in FIG. 2, the upper side in FIGS. 3 to 5) of the accommodating tube portion 36A, and the small diameter tube portion 36C for joining which is formed at an opening side (one side) of the accommodating tube portion 36A so as to reduce the outer periphery of the opening in diameter.

The inner periphery of the cylinder 44 is joined to the outer periphery of the small diameter tube portion 36C of the housing 36 by brazing. The accommodating tube portion 36A of the housing 36 is so formed that an inner diameter dimension thereof is slightly larger than an outer diameter dimension of the armature 48. The armature 48 is accommodated in the accommodating tube portion 36A in an axially movable manner. In other words, the housing 36 opens at one axial end side, and the armature 48 is accommodated therein.

As illustrated in FIG. 5 in an enlarged manner, the accommodating tube portion 36A of the housing 36 includes the first end portion 36D, the second end portion 36E, and the third end portion 36F in an order from the inner periphery at the open end (in an order from the inner diameter side toward the outer diameter side). The first end portion 36D faces the anchor 41, or more specifically, the protruding portion 41C (reduced diameter portion 41C1) of the anchor 41. The second end portion 36E is axially recessed relative to the first end portion 36D and includes an abutment portion 36E1 abutting against the other end 44A of the cylinder 44 as viewed in the axial direction. The third end portion 36F is axially recessed further back from the second end portion 36E relative to the first end portion 36D and accommodates solder (copper ring) for sealing space between the third end portion 36F and the cylinder 44. That is, the space between the third end portion 36F and the other end 44A of the cylinder 44 is a solder accommodating portion 45 in which solder is accommodated.

As described above, the embodiment provides the end portions 36D, 36E, and 36F which are three steps on the open end side (lower side in FIGS. 3 to 5) of the housing 36. The third end portion 36F, in particular, configures the solder accommodating portion 45 between itself and the other end 44A of the cylinder 44. The second end portion 36E (abutting portion 36E1) configures a position fixing portion that performs the alignment (positioning) of the housing 36 by abutting against the other end 44A of the cylinder 44.

The first end portion 36D configures a magnetic flux transmitting portion. As illustrated in FIG. 5, the first end portion 36D includes an inclined surface 36D1 formed on an outer diameter side thereof. To be more specific, the first end portion 36D includes the inclined surface 36D1 that is inclined in such a direction that an outer diameter dimension increases toward the other axial side. The inclined surface 36D1 can be used as a guide at the time of insertion of the small diameter tube portion 36C of the housing 36 into the cylinder 44.

The housing 36 and the cylinder 44 forms a pressure container by the housing 36 (small diameter tube portion 36C) being press-fitted inside the cylinder 44, and then brazing being performed. An outer diameter of the small diameter tube portion 36C of the housing 36 is therefore larger than an inner diameter of the cylinder 44 (leaving tightening allowance). The housing 36 (small diameter tube portion 36C) is press-fitted into the cylinder 44 up to the point that the second end portion 36E (abutting portion 36E1) and the other end 44A of the cylinder 44 abut against each other. The brazing may be performed by placing solder (copper ring) in the solder accommodating portion 45 between the third end portion 36F and the other end 44A of the cylinder 44.

The lid portion 36B of the housing 36 is integrally formed in the accommodating tube portion 36A as a tube element with a lid which closes the accommodating tube portion 36A from the other axial side. The lid portion 368 has a stepped shape having smaller outer diameter than the accommodating tube portion 36A. A fitted tube portion 51A of the cover member 51 is fitted onto an outer peripheral side of the lid portion 36B. A bottomed, stepped hole 37 is formed in the housing 36 to be located at an inner side of the lid portion 36B. The stepped hole 37 comprises a bush attachment hole portion 37A and a small diameter hole portion 37B that is located further back than the bush attachment hole portion 37A and formed to have small diameter. Provided inside the bush attachment hole portion 37A is a first bush 38 for supporting the actuating pin 49 in a slidable manner.

The other side end surface of the lid portion 36B of the housing 36 is arranged to face a lid plate 51B of the cover member 51 with an axial space therebetween. The axial space functions to prevent axial force from being applied directly onto the housing 36 from the lid plate 51B side of the cover member 51 through the lid portion 36B. The lid portion 36B of the housing 36 does not necessarily have to be integrally formed of the same material (magnetic element) as the accommodating tube portion 36A. The lid portion 36B in this case may be formed, for example, of a rigid metal material, ceramic material or fiber reinforced resin material, instead of magnetic material. A join between the accommodating tube portion 36A and the lid portion 36B of the housing 36 is positioned in consideration of transmission of a magnetic flux.

The yoke 39 is provided at one axial side of the armature 48. The yoke 39 is a magnetic member that forms, in consort with the housing 36, a magnetic circuit (magnetic path) over the inner and outer peripheral side of the mold coil 34 (coil 34A). The yoke 39, like the housing 36, is formed using magnetic material (magnetic element). The yoke 39 is configured by including the annular portion 39B radially extending at one axial side (one side in the winding axis direction) of the mold coil 34 (coil 34A) and formed into a stepped fixing hole 39A on the inner peripheral side, and the tubular projecting portion 39C protruding from the inner peripheral side of the annular portion 39B toward the other axial side (coil 34A side) of the mold coil 34 to have a tubular shape along the axial direction of the fixing hole 39A. The tubular projecting portion 39C configures a joining projection (tube portion) to be joined to the cylinder 44. The cylinder 44 is inserted in the inner diameter side of the tubular projecting portion 39C.

In other words, the yoke 39 includes the fixing hole 39A, and an inner peripheral surface of the fixing hole 39A faces a part of a lateral surface portion 41D of the anchor 41. Provided inside the fixing hole 39A over the whole circumference is an inwardly flanged portion 39D protruding toward an inner diameter side. One axial side end surface (one end surface) of the cylinder 44 abuts against a lateral surface (lateral surface at the coil 34A side) of the inwardly flanged portion 39D. The outer periphery of the one axial side of the cylinder 44 is fitted to the inner periphery of the yoke 39, namely, an inner surface of the fixing hole 39A (that is, the inner peripheral surface of the tubular projecting portion 39C).

The yoke 39 is formed as an integral object including an one side tube portion 39O in a cylindrical shape, which extends from an outer peripheral side of the annular portion 39B toward the one axial side (the damping force adjustment valve 18 side), the other side tube portion 39H extending from the outer peripheral side of the annular portion 39B toward the other axial side (the cover member 51 side) and formed so as to surround the mold coil 34 from radially outside, and a swaged portion (staked portion or crimped portion) 39J provided at a distal end side of the other side tube portion 39H to hold a flanged portion 51C of the cover member 51 in a non-slip state. Provided in the other side tube portion 39H of the yoke 39 is a notch 39K for exposing the cable draw-out portion 34E of the mold coil 34 outside the other side tube portion 39H.

An engaging concave portion 39L is provided between the one side tube portion 39O and the other side tube portion 39H of the yoke 39 (over the whole circumference or at a plurality of places at circumferential intervals). The engaging concave portion 39L is formed to have a semicircular cross-section so as to open in an outer peripheral surface of the yoke 39. The lock nut 53 screwed into the valve case 19 of the damping force adjustment valve 18 is engaged with the engaging concave portion 39L with a non-slip ring 54 (see FIG. 2) intervening therebetween. A seal groove 39M is provided in an outer peripheral surface of the one side tube portion 39G over the whole circumference. An O-ring 40 (see FIG. 2) as a seal member is placed in the seal groove 39M. The O-ring 40 seals space between the yoke 39 (one side tube portion 39O) and the valve case 19 of the damping force adjustment valve 18 in a liquid tight manner.

The anchor 41 is provided at one side in the moving direction of the armature 48. The anchor 41 is a second fixed iron core (stator) that is fixed inside the fixing hole 39A of the yoke 39 by means such as press-fitting. Like the housing 36 (first fixed iron core) and the yoke 39, the anchor 41 is formed of magnetic material (magnetic element), such as low-carbon steel and mechanical structural carbon steel (S10C), to have such a shape as to fill the fixing hole 39A of the yoke 39 from inside. The anchor 41 is formed as an annular element having a short cylinder-like shape, a central region of which is a through-hole 41A extending in the axial direction. One axial side surface (a surface that axially faces the cap 31 of the damping force adjustment valve 18 illustrated in FIG. 2) of the anchor 41 is formed into a flat face as well as one side surface of the annular portion 39B of the yoke 39.

A circular concave indent portion 41B is provided in the form of a recess on the other axial side (the other side surface that axially faces the armature 48) of the anchor 41 to be coaxial with the accommodating tube portion 36A. The concave indent portion 41B is formed as a circular groove having a slightly larger diameter than the armature 48 to allow the armature 48 to be inserted therein in such a manner that the armature 48 may come into and out of the concave indent portion 41B by magnetic force. Accordingly, a cylindrical protruding portion 41C is provided on the other side of the anchor 41. An outer peripheral surface on an open side of the protruding portion 41C is formed into a circular cone-shaped surface so that magnetic characteristics are linear (straight) between the anchor 41 and the armature 48.

In other words, the protruding portion 41C that is also called a corner portion protrudes from an outer peripheral side of the anchor 41 toward the other axial side to have a cylindrical shape. The outer peripheral surface (outer peripheral surface at the open side) of the protruding portion 41C is a conical surface inclined to have a tapered shape so that an outer diameter dimension thereof gradually decreases toward the other axial side (open side). More specifically, the protruding portion 41C of the anchor 41 includes a reduced diameter portion 41C1 that is provided in such a position as to face an opening (or more specifically, the first end portion 36D) of the housing 36 (accommodating tube portion 36A). An outer diameter of the reduced diameter portion 41C1 decreases toward the opening of the accommodating tube portion 36A.

The lateral surface portion 41lD is formed on the outer peripheral side of the anchor 41. The lateral surface portion 41D extends along the outer periphery of the protruding portion 41C in a direction away from the opening of the accommodating tube portion 36A of the housing 36. An end portion of the lateral surface portion 41D which is located on a side separated from the opening of the accommodating tube portion 36A is an annular flange portion 41E protruding radially outwards. The annular flange portion 41E is arranged at a position that is widely separated from an open end of the accommodating tube portion 36A of the housing 36 toward one axial side (that is, arranged in an opposite-side end portion to the concave indent portion 41B).

The annular flange portion 41F is fixed, for example, inside the fixing hole 39A of the yoke 39 by means such as press-fitting. The annular flange portion 41E is a fixed portion of the anchor 41 (lateral surface portion 41D) with respect to the fixing hole 39A of the yoke 39, and also is a portion facing the fixing hole 39A in the radial direction. The lateral surface portion 411D (except the annular flange portion 41E) of the anchor 41 faces an inner peripheral surface of the cylinder 44 and an inner surface of the inwardly flanged portion 39D of the yoke 39 leaving space (radial space) between the lateral surface portion 41D on one hand and the inner peripheral surface of the cylinder 44 and the inner surface of the inwardly flanged portion 39D on the other.

In any case, the anchor 41 comprises the protruding portion 41C and the lateral surface portion 41D which are integrally formed by a magnetic element. The anchor 41 is provided in such a position as to face the opening of the accommodating tube portion 36A of the housing 36. The protruding portion 41C protrudes toward the opening of the accommodating tube portion 36A of the housing 36. The lateral surface portion 411D extends from the outer periphery of the protruding portion 41C in a direction away from the opening of the accommodating tube portion 36A of the housing 36. The lateral surface portion 41D is arranged leaving space between itself on one hand and the inner peripheral surface of the cylinder 44 and the inner surface of the inwardly flanged portion 39D of the yoke 39 on the other.

As illustrated in FIG. 3, a second bush 43 for slidably supporting the actuating pin 49 is fitted in the stepped through-hole 41A that is formed at the center (inner periphery) side of the anchor 41. As illustrated in FIG. 2, the pilot body 26, the return spring 28, the disc valve 29, the holding plate 30, the cap 31 and the other elements of the damping force adjustment valve 18 are inserted in an inner peripheral side of the one side tube portion 39G of the yoke 39. The valve case 19 of the damping force adjustment valve 18 is fitted to (fitted over) an outer peripheral side of the one side tube portion 39G.

The cylinder 44 is provided between the yoke 39 and the anchor 41 with respect to the radial direction. The cylinder 44 is provided between the yoke 39 and the housing 36 with respect to the axial and radial directions. In other words, the cylinder 44 is a non-magnetic joint member (joining member) that is provided at the inner peripheral side of the mold coil 34 (coil 34A) to be located between the small diameter tube portion 36C of the housing 36 and the tubular projecting portion 39C of the yoke 39. The cylinder 44 comprises a non-magnetic element. To be more specific, the cylinder 44 is formed into a cylindrical element (mere cylindrical element) using non-magnetic material, such as austenitic stainless steel.

The outer periphery of the cylinder 44 on one end side (yoke 39 side) in the winding axis direction of the mold coil 34 (coil 34A) is joined to the inner periphery of the yoke 39 (fixing hole 39A, tubular projecting portion 39C). The cylinder 44 is fixed to the yoke 39, one axial side of which functions as a stator. The inner periphery of the cylinder 44 on the other end side (housing 36 side) in the winding axis direction of the mold coil 34 (coil 34A) is joined to the outer periphery of the housing 36 (small diameter tube portion 36C). In other words, the cylinder 44 is fitted (press-fitted) onto the outer side (outer peripheral side) of the small diameter tube portion 36C of the housing 36. The cylinder 44 and the small diameter tube portion 36C are joined together by brazing. In this case, the other end 44A of the cylinder 44 abuts against the second end portion 36E (abutting portion 36E1) of the small diameter tube portion 36C of the housing 36. The cylinder 44 is fitted (press-fitted) into the inner side (inner peripheral side) of the tubular projecting portion 39C of the yoke 39. The cylinder 44 and the tubular projecting portion 39C are joined together by brazing. In such a case, one end of the cylinder 44 abuts against a lateral surface of the inwardly flanged portion 39D of the yoke 39. The braze joining is performed after the cylinder 44, the housing 36, and the yoke 39 are assembled together by press-fitting the cylinder 44 and the housing 36 and press-fitting the cylinder 44 and the yoke 39.

As described above, according to the present embodiment, the cylinder 44 is joined to the housing 36 and the yoke 39 with solder. The solder may be, for example, pure copper solder. That is, brazing may be performed using solder (copper ring) containing pure copper solder through brazing processing, for example, at a temperature of 1000° C. or higher. Instead of pure copper solder, the solder may be, for example, brass solder, nickel solder, gold solder, palladium solder or another solder. In any case, the cylinder 44 is joined to the small diameter tube portion 36C of the housing 36 and the tubular projecting portion 39C of the yoke 39 by brazing. After the brazing processing, rapid cooling processing is performed. At this point, the inner diameter of the cylinder 44 is formed larger than an outer diameter of the lateral surface portion 41D of the anchor 41.

The cylinder 44 is formed of material having a different linear expansion coefficient from material of which the yoke 39 and the housing 36 are formed. For example, the cylinder 44 is made of stainless steel, and the housing 36 is made of mechanical structural carbon steel (S10C). In such a case, when the cylinder 44 and the housing 36 are raised in temperature along with brazing, the cylinder 44 made of stainless steel having a great linear expansion coefficient expands more than the housing 36. Solder therefore can be received in space formed between the inner periphery on the other end side of the cylinder 44 and the outer periphery of the housing 36 (small diameter tube portion 36C). That is, the solder accommodated in the solder accommodating portion 45 between the third end portion 36F of the housing 36 and the other end 44A of the cylinder 44 can be received between the inner periphery on the other end side of the cylinder 44 and the outer periphery of the housing 36 (small diameter tube portion 36C). This makes it possible to improve sealability between the cylinder 44 and the housing 36 (small diameter tube portion 36C).

In contrast, a non-contact portion, not shown, can be provided between the outer periphery of the cylinder 44 and the inner periphery of the yoke 39 (the inner surface of the fixing hole 39A, the inner peripheral surface of the tubular projecting portion 39C). For example, the fixing hole 39A (inner diameter side of the tubular projecting portion 39C) of the yoke 39 may be provided with a small diameter hole portion having a small inner diameter dimension and a large diameter hole portion having a larger inner diameter dimension than the small diameter hole portion, in an order from the one axial side (inwardly flanged portion 39D side). In this case, even if the cylinder 44 made of stainless steel having a great linear expansion coefficient is liable to expand more than the yoke 39 when the cylinder 44 and the yoke 39 are raised in temperature along with brazing, solder can be received in the non-contact portion between the outer periphery of the cylinder 44 and the inner periphery of the yoke 39 (the inner surface of the fixing hole 39A, the inner peripheral surface of the tubular projecting portion 39C). This makes it possible to improve sealability between the cylinder 44 and the yoke 39 (fixing hole 39A).

The joining of the cylinder 44 and the housing 36 and/or the joining of the cylinder 44 and the yoke 39 may be configured by heating and joining the cylinder 44, the housing 36 and/or the yoke 39 using another joining means than brazing (for example, joining means performed through welding, such as laser welding). In other words, the cylinder 44 may be joined to the housing 36 and the yoke 39 by welding.

The armature 48 is a mover comprising a magnetic element that is provided between the accommodating tube portion 36A of the housing 36 and the concave indent portion 41B of the anchor 41 in such a manner as to movable in the winding axis direction of the coil 34A. The armature 48 is arranged on the inner peripheral side of the accommodating tube portion 36A of the housing 36, the concave indent portion 41B of the anchor 41, the tubular projecting portion 39C of the yoke 39, and the cylinder 44. The armature 48 is axially movable between the accommodating tube portion 36A of the housing 36 and the concave indent portion 41B of the anchor 41. In other words, the armature 48 is arranged on the inner peripheral side of the accommodating tube portion 36A of the housing 36 and the concave indent portion 41B of the anchor 41 and movable in the axial direction through the first and second bushes 38, 43 and the actuating pin 49 by magnetic force generated in the coil 34A.

The armature 48 is provided fixedly to (integrally with) the actuating pin 49 extending through the center of the armature 48 and moves with the actuating pin 49. The actuating pin 49 is slidably supported in the axial direction by the lid portion 36B of the housing 36 and the anchor 41 through the first and second bushes 38 and 43. The armature 48 is formed of an iron-based magnetic element to have a substantially cylindrical shape, for example, like the housing 36, the yoke 39, and the anchor 41. Thrust force is generated in the armature 48 by magnetic force generated in the coil 34A. The thrust force acts in a direction of being absorbed into the concave indent portion 41B of the anchor 41.

The actuating pin 49 is a shaft portion that transmits the thrust force of the armature 48 to the pilot valve element 32 of the damping force adjustment valve 18 (control valve). The actuating pin 49 is formed of a hollow rod. The armature 48 is integrally fixed to an axially middle portion of the actuating pin 49 by means such as press-fitting. The armature 48 and the actuating pin 49 are thus sub-assembled. The actuating pin 49 is slidably supported at each axial side by the lid portion 36B on the housing 36 side and the yoke 39 (anchor 41) through the first and second bushes 38 and 43.

One end side (a left-side end portion in FIG. 2 and a lower end portion in FIG. 3) of the actuating pin 49 axially protrudes from the anchor 41 (yoke 39). The pilot valve element 32 of the damping force adjustment valve 18 is fixed to a protruding end on the one end side of the actuating pin 49. The pilot valve element 32 therefore moves in the axial direction together with the armature 48 and the actuating pin 49 in an integral manner. In other words, a preset valve-opening pressure of the pilot valve element 32 is a pressure value corresponding to the thrust force of the armature 48 based on current applied to the coil 34A. The armature 48 is moved in the axial direction by the magnetic force from the coil 34A, to thereby open/close the pilot valve (namely, the pilot valve element 32 with respect to the pilot body 26) of the hydraulic shock absorber 1.

The cover member 51 is a magnetic element cover that covers the mold coil 34 from outside in consort with the other side tube portion 39H of the yoke 39. The cover member 51 is formed of magnetic material (magnetic element) as a lid element that covers the mold coil 34 from the other axial side and forms a magnetic circuit (magnetic path) outside the mold coil 34 (coil 34A) in consort with the other side tube portion 39H of the yoke 39. The cover member 51 is formed into a tube with a lid as a whole. The cover member 51 is generally configured by the cylindrical fitted tube portion 51A and the lid plate 51B having a circular plate-like shape which closes the other end side (a right-side end portion in FIG. 2 and an upper end portion in FIG. 3) of the fitted tube portion 51A.

The fitted tube portion 51A of the cover member 51 is configured to be fitted over an outer periphery of the lid portion 36B of the housing 36 and, in this state, accommodate the lid portion 36B of the housing 36 in the inside. The lid plate 51B of the cover member 51 is so configured that an outer peripheral side thereof is the annular flanged portion 51C extending radially outside the fitted tube portion 51A. An outer peripheral edge of the flanged portion 51C is fixed to the swaged portion (staked portion or crimped portion) 39J provided in the other side tube portion 39I1 of the yoke 39. The other side tube portion 39H of the yoke 39 and the lid plate 51B of the cover member 51 are thus preliminarily assembled (sub-assembled) together with the mold coil 34 built-in on the inside as illustrated in FIG. 3.

In the state where the mold coil 34 is built-in on the inside of the other side tube portion 39H of the yoke 39 and the lid plate SIB of the cover member 51 as described above, the lid portion 36B of the housing 36 is fitted inside the fitted tube portion 51A of the cover member 51. This enables transmission of a magnetic flux between the fitted tube portion 51A and the lid plate 51B of the cover member 51 on one hand and the yoke 39 on the other. The resin member 34C of the mold coil 34 is fitted on an outer peripheral side of the fitted tube portion 51A of the cover member 51, and a seal groove 51D is formed in the outer peripheral side over the whole circumference. A seal member (O-ring 52, for example) is placed in the seal groove 51D. The O-ring 52 seals space between the mold coil 34 and the cover member 51 (fitted tube portion 51A) in a liquid tight manner. This prevents dust containing rain water or mud water from entering through the space between the cover member 51 and the mold coil 34 into space between the housing 36 and the mold coil 34, space between the housing 36 and the cover member 51, and other spaces.

The yoke 39 and the cover member 51 are fastened, with the mold coil 34 built-in on the inside as illustrated in FIG. 3, to the valve case 19 of the damping force adjustment valve 18 using the lock nut 53 and the non-slip ring 54 as fastening members as illustrated in FIG. 2. In such a case, the non-slip ring 54 is attached to the engaging concave portion 39L of the yoke 39 prior to the attachment of the lock nut 53. The non-slip ring 54 partially protrudes from the engaging concave portion 39L of the yoke 39 in the radially outward direction. The non-slip ring 54 is configured to transmit fastening force of the lock nut 53 to the one side tube portion 39G of the yoke 39.

The lock nut 53 is formed into a stepped tubular element. The lock nut 53 is provided with an internal (female) thread portion 53A and an engaging tube portion 53B. The internal thread portion 53A is located at one axial side of the lock nut 53 and threadedly engaged with an external (male) thread portion 19B of the valve case 19 at an inner peripheral side. The engaging tube portion 538 is bent radially inwards to have an inner diameter dimension that is smaller than an outer diameter dimension of the non-slip ring 54. The engaging tube portion 53B is engaged with the non-slip ring 54 from outside. The lock nut 53 is a fastening member for integrally joining the damping force adjustment valve 18 and the solenoid 33 by threadedly engaging the internal thread portion 53A with the external thread portion 193 of the valve case 19 with an inner surface of the engaging tube portion 538 abutting against the non-slip ring 54 placed in the engaging concave portion 39L of the yoke 39.

The solenoid 33, the damping force adjustment mechanism 17, and the hydraulic shock absorber 1 according to the present embodiment are configured as described above. The following discussion explains the operation thereof.

First, when the hydraulic shock absorber 1 is mounted on a vehicle, such as an automobile, for example, an upper end side (protruding end side) of the piston rod 8 is attached to a vehicle body side of the vehicle, and the attachment eye 3A side provided in the bottom cap 3 is attached to a wheel side. The solenoid 33 of the damping force adjustment mechanism 17 is connected to a control device (controller) provided at the vehicle body side of the vehicle through an electric wiring cable and the like, neither shown.

When vertical vibrations are generated due to irregularity of road surfaces or another like factor during the driving of the vehicle, the piston rod 8 is displaced to be extended from and compressed into the outer tube 2. Damping force thus can be generated by the damping force adjustment mechanism 17 and the like, to thereby absorb the vibrations of the vehicle. At this point, the generated damping force of the hydraulic shock absorber 1 can be variably adjusted by using the controller to control a value of electric current applied to the coil 34A of the solenoid 33 and thus adjusting valve-opening pressure of the pilot valve element 32.

For example, during an extension stroke of the piston rod 8, a compression-side check valve 7 of the piston 5 is closed by motion of the piston 5 within the inner tube 4. Before the disc valve 6 of the piston 5 is opened, the oil liquid in the rod-side fluid chamber B is pressurized and flows through the fluid hole 4A of the inner tube 4, the annular fluid chamber D, and the connecting port 12C of the middle tube 12 into the fluid passage 20B of the connecting pipe element 20 of the damping force adjustment valve 18. At this point, the oil liquid of amount corresponding to the motion of the piston 5 opens an extension-side check valve 16 of the bottom valve 13 and thus flows from the reservoir chamber A into the bottom-side fluid chamber C. When the pressure in the rod-side fluid chamber B reaches valve-opening pressure of the disc valve 6, the disc valve 6 is opened to release the pressure in the rod-side fluid chamber B into the bottom-side fluid chamber C.

In the damping force adjustment mechanism 17, before the main valve 23 is opened (low piston speed region), the oil liquid that flows into the fluid passage 20B of the connecting pipe element 20 passes through the center hole 21A of the valve member 21, the center hole 24H of the pilot pin 24, and the center hole 26C of the pilot body 26, pushes open the pilot valve element 32, and flows inside the pilot body 26 as shown by arrow X in FIG. 2. The oil liquid that flows inside the pilot body 26 runs between the flange portion 32A of the pilot valve element 32 and the disc valve 29, passes through the fluid passage 30A of the holding plate 30, the notch 31A of the cap 31, and the fluid chamber 19C of the valve case 19, and flows into the reservoir chamber A. When the pressure in the fluid passage 20B of the connecting pipe element 20, that is, the pressure in the rod-side fluid chamber B reaches valve-opening pressure of the main valve 23 as a result of increase of piston speed, the oil liquid that flows into the fluid passage 20B of the connecting pipe element 20 passes through the fluid passage 21B of the valve member 21, pushes open the main valve 23, and passes through the fluid chamber 19C of the valve case 19 to flow into the reservoir chamber A as shown by arrow Y in FIG. 2.

During the compression stroke of the piston rod 8, the motion of the piston 5 within the inner tube 4 opens the compression-side check valve 7 of the piston 5 and closes the extension-side check valve 16 of the bottom valve 13. Before the bottom valve 13 (disc valve 15) is opened, the oil liquid in the bottom-side fluid chamber C flows into the rod-side fluid chamber B. At the same time, the oil liquid of amount corresponding to the entry of the piston rod 8 into the inner tube 4 flows from the od-side fluid chamber B through the damping force adjustment valve 18 into the reservoir chamber A through similar channels as during the extension stroke. When the pressure in the bottom-side fluid chamber C reaches valve-opening pressure of the bottom valve 13 (disc valve 15), the bottom valve 13 (disc valve 15) is opened to release the pressure in the bottom-side fluid chamber C into the reservoir chamber A.

During the extension and compression strokes of the piston rod 8, therefore, before the main valve 23 of the damping force adjustment valve 18 is opened, damping force is generated by the orifice 24C of the pilot pin 24 and the valve-opening pressure of the pilot valve element 32, and after the main valve 23 is opened, damping force is generated according to the opening degree of the main valve 23. In such a case, the damping force can be directly controlled, regardless of piston speed, by adjusting the valve-opening pressure of the pilot valve element 32 through energization of the coil 34A of the solenoid 33.

In particular, if the thrust force of the armature 48 is reduced by decreasing the electric current applied to the coil 34A, the valve-opening pressure of the pilot valve element 32 is reduced, resulting in generation of a soft damping force. If the thrust force of the armature 48 is increased by increasing the electric current applied to the coil 34A, the valve-opening pressure of the pilot valve element 32 is raised to generate a hard damping force. The valve-opening pressure of the pilot valve element 32 then changes the inner pressure of the back pressure chamber 27 that is in communication with the pilot valve element 32 through the fluid passage 25 located upstream. Accordingly, when the valve-opening pressure of the pilot valve element 32 is controlled, the valve-opening pressure of the main valve 23 can be adjusted at the same time. This makes it possible to enlarge an adjustment range of damping force characteristics.

If the thrust force of the armature 48 is lost, attributable to breaking of the coil 34A or another reason, the pilot valve element 32 is retreated (displaced in a direction away from the valve seat portion 26E) by the return spring 28, and the flange portion 32A of the pilot valve element 32 and the disc valve 29 abut against each other. In such a state, damping force can be generated by the valve-opening pressure of the disc valve 29. In the event of a failure, such as the breaking of a coil, a necessary damping force can be obtained.

According to the embodiment, as illustrated in FIGS. 3 to 5, the first end portion 36D, the second end portion 36E, and the third end portion 36F are provided on the open end side of the housing 36 (small diameter tube portion 36C) of the solenoid 33. Alignment (axial positioning) of the housing 36 and the cylinder 44 can be performed by abutment of the second end portion 36E (abutting portion 36E1) and the other end 44A of the cylinder 44. This eliminates the necessity of providing a projection for alignment in the inner side of the cylinder 44, making it possible to reduce the cost for the cylinder 44. The elimination of necessity of providing a projection for alignment also improves the degree of freedom in designing a distance between the housing 36 (small diameter tube portion 36C) and the anchor 41 (protruding portion 41C).

The first end portion 36D faces the anchor 41 (protruding portion 41C) while being positioned by the abutment of the second end portion 36E (abutting portion 36E1) and the other end 44A of the cylinder 44. In such a case, due to the elimination of necessity of providing a projection for alignment, an axial distance between the first end portion 36D and the anchor 41 (protruding portion 41C) can be reduced, which improves thrust characteristics. Solder is accommodated between the third end portion 36F and the other end 44A of the cylinder 44. The presence of the solder therebetween makes it possible to restrain disturbance in the axial positional relation between the housing 36 (small diameter tube portion 36C) and the cylinder 44, to thereby improve accuracy in axial positioning between the housing 36 and the cylinder 44. In addition, the brazing of the housing 36 (small diameter tube portion 36C) and the cylinder 44 can be performed in a stable manner, which makes it possible to improve sealability (sealing performance) between the housing 36 and the cylinder 44.

As described above, the embodiment makes it possible to reduce the cost for the cylinder 44, improve the degree of freedom in designing the housing 36 (small diameter tube portion 36C) and the anchor 41 (protruding portion 41C), improve the thrust characteristics of the solenoid 33, improve accuracy in axial positioning between the housing 36 and the cylinder 44, and improve sealability (sealing performance) between the housing 36 and the cylinder 44. Since the solenoid 33 can be improved in thrust characteristics, it is also possible to improve characteristics (valve-opening characteristics, for example) of the pilot valve element 32 of the damping force adjustment mechanism 17 and therefore the damping force characteristics of the hydraulic shock absorber 1.

According to the embodiment, as illustrated in FIG. 5, the first end portion 36D includes the inclined surface 36D1 on the outer diameter side. The inclined surface 36D1 of the first end portion 36D can be used as a guide surface when the housing 36 is inserted into the cylinder 44. This makes it possible to facilitate the insertion of the housing 36 into the cylinder 44.

The embodiment is discussed with the example where the third end portion 36F is an orthogonal surface extending in a direction orthogonal to a center axis of the accommodating tube portion 36A (small diameter tube portion 36C) of the housing 36 as illustrated in FIG. 5. The invention, however, does not necessarily have to be configured this way. For example, as seen in a first modification example illustrated in FIG. 6, a third end portion 61 may be an inclined surface that is inclined in such a direction that an outer diameter dimension increases toward the other axial side (upper side in FIG. 6). In this case, solder can be accommodated (placed) in a solder accommodating portion 45 between the third end portion 61 and the other end 44A of a cylinder 44.

The embodiment is discussed with the example where the outer periphery (outer peripheral surface) of one side (lower side in FIG. 4) of the cylinder 44 and the inner periphery (inner peripheral surface) of the tubular projecting portion 39C of the yoke 39 are joined (fixed) together as illustrated in FIG. 4. The invention, however, does not necessarily have to be configured this way. For example, as seen in a second modification example illustrated in FIG. 7, the invention may be so configured that an inner periphery (inner peripheral surface) of one side (lower side in FIG. 7) of a cylinder 44 and an outer periphery (outer peripheral surface) of a tubular projecting portion 71 of a yoke 39 are joined together. In other words, braze joining may be performed after the inner periphery (inner peripheral surface) of one side of the cylinder 44 is press-fitted onto the outer periphery (outer peripheral surface) of the yoke (tubular projecting portion 71).

The embodiment is discussed with the example where one axial side end surface of the cylinder 44 abuts against the lateral surface (lateral surface on the coil 34A side) of the inwardly flanged portion 39D of the yoke 39 as illustrated in FIGS. 3 and 4. The invention, however, does not necessarily have to be configured this way. For example, as seen in a third modification example illustrated in FIG. 8, an anchor 41 may be fixed to a fixing hole 39A of a yoke 39 by means such as press-fitting that press-fits an annular flange portion 82 of the anchor 41 to an inwardly flanged portion 81 of the fixing hole 39A of the yoke 39, and one axial side end surface of a cylinder 44 may be brought into abutment against both the inwardly flanged portion 81 and the annular flange portion 82. In this case, too, space (radial space) is provided between an inner peripheral surface of the cylinder 44 and a lateral surface portion 411D of the anchor 41 (except the annular flange portion 41E). This makes it possible to restrain a protruding portion 41C of the anchor 41 from Lilting (restrain the protruding portion 41C from leaning toward an inner diameter side).

The embodiment is discussed with the example where the cylinder 44 is joined to the housing 36 and the yoke 39 through solder. The invention, however, does not necessarily have to be configured this way. For example, the cylinder 44 may be joined to the housing 36 and the yoke 39 by welding. Same applies to the first to third modification examples.

The embodiment is discussed with the example where the anchor 41 is fixed inside the fixing hole 39A of the yoke 39 by press-fitting. The invention, however, does not necessarily have to be configured this way. For example, an anchor may be fixed inside a yoke by using threadedly engaging means, such as a screw, caulking (staking, swaging or crimping) means or another like means. Same applies to the first to third modification examples.

The embodiment is discussed with the example where the anchor 41 and the yoke 39 are configured as separate elements (separate components). The invention, however, does not necessarily have to be configured this way. For example, an anchor and a yoke may be configured in an integral manner (into a single component). Same applies to the first to third modification examples.

The embodiment is discussed with the example where one side of the cylinder 44 is fixed to the yoke 39 as a stator. The invention, however, does not necessarily have to be configured this way. For example, one side of a cylinder (joining member) may be fixed to an anchor as a stator. Same applies to the first to third modification examples.

The embodiment is discussed with the example where the yoke 39 is provided with the other side tube portion 39H, and the other side tube portion 39H is fixed to the outer peripheral side of the cover member 51 through the swaged portion (staked portion or crimped portion) 39J at the distal end side (the other axial side). The invention, however, does not necessarily have to be configured this way. For example, an annular portion and the other side tube portion of a yoke may be formed as separate elements, and the other side tube portion may be formed integrally with a cover member. Same applies to the first to third modification examples.

The embodiment is discussed with an example where the solenoid 33 is configured as a proportional solenoid. The invention, however, does not necessarily have to be configured as discussed above. For example, the solenoid may be configured as an on-off solenoid. Same applies to the first to third modification examples.

The embodiment and the modification examples are discussed with an example where the solenoid 33 is used as a variable damping force actuator of the hydraulic shock absorber 1, that is, the pilot valve element 32 configuring the pilot valve of the damping force adjustment valve 18 is a driven target of the solenoid 33. The invention, however, does not necessarily have to be configured as discussed above. A solenoid can be widely used, for example, as an actuator installed in every kind of mechanical device, such as a valve used in a hydraulic circuit, that is, as a driving device that drives a driven target to be linearly driven.

For example, the following modes are possible for the solenoids, the damping force adjustment mechanisms, and the damping force adjustable shock absorbers according to the above-discussed embodiment and modification examples.

A first mode provides a solenoid comprising a coil wound into an annular shape and configured to generate magnetic force by being energized; a mover (movable element) provided to be movable in a winding axis direction of the coil and comprising a magnetic element; a stator provided at one side in a moving direction of the mover; a joining member fixed to the stator at one axial side and comprising a non-magnetic element; and an accommodating member configured to accommodate the mover, open at one axial end side, and including, in an order from an inner periphery at an open end, a first end portion facing the stator, a second end portion that is axially recessed back from the first end portion and includes an abutting portion that abuts against the other end of the joining member, and a third end portion that is axially recessed further back from the first end portion than the second end portion and configured to accommodate solder for sealing space between the third end portion and the joining member.

According to the first mode, the alignment (axial positioning) of the accommodating member and the joining member can be performed by abutment of the second end portion of the accommodating member and the other end of the joining member. This eliminates the necessity of providing a projection for alignment inside the joining member, which makes it possible to reduce the cost for the joining member. Since it is unnecessary to provide a projection for alignment, the degree of freedom in designing the accommodating member and the stator can be improved. The first end portion of the accommodating member faces the stator while being positioned by abutment of the second end portion and the other end of the joining member. In this case, due to the elimination of necessity of providing a projection for alignment, it is possible to reduce an axial space between the first end portion and the stator and therefore improve thrust characteristics. Solder is accommodated between the third end portion of the accommodating member and the other end of the joining member. The presence of the solder therebetween makes it possible to restrain disturbance of the axial positional relation between the accommodating member and the joining member and therefore improve accuracy in axial positioning between the accommodating member and the joining member. In addition, the brazing of the accommodating member and the joining member can be performed in a stable manner, which makes it possible to improve sealability (sealing performance) between the accommodating member and the joining member.

In a second mode according to the first mode, the third end portion is an inclined surface that is inclined in such a direction that an outer diameter dimension increases toward the other axial side. According to the second mode, solder can be accommodated between the third end portion that is the inclined surface and the other end of the joining member.

In a third mode according to the first mode, the first end portion includes an inclined surface that is inclined in such a direction that an outer diameter dimension increases toward the other axial side. According to the third mode, the inclined surface of the first end portion can be used as a guide surface when the accommodating member is inserted into the joining member. This makes it possible to facilitate the insertion of the accommodating member into the joining member.

A fourth mode provides a damping force adjustment mechanism comprising a coil wound into an annular shape and configured to generate magnetic force by being energized; a mover provided to be movable in a winding axis direction of the coil and comprising a magnetic element; a control valve configured to be controlled by motion of the mover; a stator provided at one side in a moving direction of the mover, a joining member fixed to the stator at one axial side and comprising a non-magnetic element; and an accommodating member configured to accommodate the mover, open at one axial end side, and including, in an order from an inner periphery at an open end, a first end portion facing the stator, a second end portion that is axially recessed back from the first end portion and includes an abutting portion that abuts against the other end of the joining member, and a third end portion that is axially recessed further back from the first end portion than the second end portion and configured to accommodate solder for sealing space between the third end portion and the joining member.

According to the fourth mode, as in the first mode, it is possible to reduce the cost for the joining member, improve the degree of freedom in designing the accommodating member and the stator, improve the thrust characteristics of the solenoid (mover), improve accuracy in axial positioning between the accommodating member and the joining member, and improve sealability (sealing performance) between the accommodating member and the joining member. Since the thrust characteristics of the solenoid (mover) can be improved, the characteristics of the control valve (valve-opening characteristics, for example) also can be improved.

A fifth mode provides a damping force adjustable shock absorber comprising a cylinder in which hydraulic fluid is sealingly contained; a piston slidably provided in the cylinder; a piston rod coupled to the piston and extending outside the cylinder; and a damping force adjustment mechanism configured to control a flow of the hydraulic fluid which is generated by sliding motion of the piston within the cylinder to generate damping force, the damping force adjustment mechanism comprising a coil wound into an annular shape and configured to generate magnetic force by being energized; a mover provided to be movable in a winding axis direction of the coil and comprising a magnetic element; a control valve configured to be controlled by motion of the mover, a stator provided at one side in a moving direction of the mover; a joining member fixed to the stator at one axial side and comprising a non-magnetic element; and an accommodating member configured to accommodate the mover, open at one axial end side, and including, in an order from an inner periphery at an open end, a first end portion facing the stator, a second end portion that is axially recessed back from the first end portion and includes an abutting portion that abuts against the other end of the joining member, and a third end portion that is axially recessed further back from the first end portion than the second end portion and configured to accommodate solder for sealing space between the third end portion and the joining member.

According to the fifth mode, as in the first mode, it is possible to reduce the cost for the joining member, improve the degree of freedom in designing the accommodating member and the stator, improve the thrust characteristics of the solenoid (mover), improve the accuracy in axial positioning between the accommodating member and the joining member, and improve the sealability (sealing performance) between the accommodating member and the joining member. Since the thrust characteristics of the solenoid (mover) can be improved, it is also possible to improve the characteristics of the control valve (valve-opening characteristics, for example) and therefore the damping force characteristics of the damping force adjustable shock absorber.

The invention is not limited to the above-discussed embodiments and may be modified in various ways. For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2020-164782 filed on Sep. 30, 2020. The entire disclosure of Japanese Patent Application No. 2020-164782 filed on Sep. 30, 2020 including the description, claims, drawings and abstract, is incorporated herein by reference in its entirety.

REFERENCE SIGN LIST

1 Hydraulic shock absorber (damping force adjustable shock absorber)
4 inner tube (cylinder)
5 Piston
8 Piston rod
17 Damping force adjustment mechanism
32 Pilot valve element (control valve)
33 Solenoid
34A Coil
36 Housing (accommodating member)
36D First end portion
36E Second end portion
36E1 Abutting portion
36F, 61 Third end portion
39 Yoke (stator)
41 Anchor (stator)
44 Cylinder (joining member)
44A Other end
48 Armature (mover)

The invention claimed is:
1. A solenoid comprising:
a coil wound into an annular shape and configured to generate magnetic force by being energized;
a mover provided to be movable in a winding axis direction of the coil and comprising a magnetic element;
a stator provided at one side in a moving direction of the mover;
a joining member fixed to the stator at one axial side and comprising a non-magnetic element; and
an accommodating member configured to accommodate the mover, the accommodating member including an open end at one axial end side, and including, in an order from an inner periphery at the open end,
a first end portion facing the stator,
a second end portion that is axially recessed back from the first end portion and that includes an abutting portion that abuts against the other end of the joining member, and
a third end portion that is axially recessed further back from the first end portion than the second end portion and configured to accommodate solder in a space between the third end portion and the joining member.
2. The solenoid according to claim 1,
wherein the third end portion is an inclined surface that is inclined in such a direction that an outer diameter dimension increases toward the other axial side.
3. The solenoid according to claim 1,
wherein the first end portion includes an inclined surface that is inclined in such a direction that an outer diameter dimension increases toward the other axial side.
4. A damping force adjustment mechanism comprising:
a coil wound into an annular shape and configured to generate magnetic force by being energized;
a mover provided to be movable in a winding axis direction of the coil and comprising a magnetic element;
a control valve configured to be controlled by motion of the mover;
a stator provided at one side in a moving direction of the mover;
a joining member fixed to the stator at one axial side and comprising a non-magnetic element; and
an accommodating member configured to accommodate the mover, the accommodating member including an open end at one axial end side, and including, in an order from an inner periphery at the open end,
a first end portion facing the stator,
a second end portion that is axially recessed back from the first end portion and that includes an abutting portion that abuts against the other end of the joining member, and
a third end portion that is axially recessed further back from the first end portion than the second end portion and configured to accommodate solder in a space between the third end portion and the joining member.
5. A damping force adjustable shock absorber comprising:
a cylinder in which hydraulic fluid is sealingly contained;
a piston slidably provided in the cylinder;
a piston rod coupled to the piston and extending outside the cylinder; and
a damping force adjustment mechanism configured to control a flow of the hydraulic fluid which is generated by sliding motion of the piston within the cylinder to generate damping force, the damping force adjustment mechanism comprising:
a coil wound into an annular shape and configured to generate magnetic force by being energized;
a mover provided to be movable in a winding axis direction of the coil and comprising a magnetic element;
a control valve configured to be controlled by motion of the mover;

a stator provided at one side in a moving direction of the mover;

a joining member fixed to the stator at one axial side and comprising a non-magnetic element; and an accommodating member configured to accommodate the mover, the accommodating member including an open end at one axial end side, and including, in an order from an inner periphery at the open end, a first end portion facing the stator, a second end portion that is axially recessed back from the first end portion and that includes an abutting portion that abuts against the other end of the joining member, and a third end portion that is axially recessed further back from the first end portion than the second end portion and configured to accommodate solder in a space between the third end portion and the joining member.

* * * * *